United States Patent [19]
Halgrimson et al.

[11] Patent Number: 5,918,195
[45] Date of Patent: Jun. 29, 1999

[54] CALIBRATION OF A COMMAND DEVICE IN CONTROL SYSTEM

[75] Inventors: Curtis A. Halgrimson; Douglas J. Olson, both of Valley City, N. Dak.

[73] Assignee: Case Corporation, Racine, Wis.

[21] Appl. No.: 08/853,501

[22] Filed: May 8, 1997

[51] Int. Cl.[6] .............................. F15B 13/01; F15B 15/00
[52] U.S. Cl. .............................. 702/94; 701/50; 364/176; 318/624
[58] Field of Search ................................ 702/94, 85, 189; 701/1, 50; 364/130, 152, 153, 176; 340/870.04, 501; 318/624

[56] References Cited

U.S. PATENT DOCUMENTS

| | | | |
|---|---|---|---|
| 4,458,471 | 7/1984 | Herwig | 56/10.2 |
| 4,508,176 | 4/1985 | Wiegardt et al. | 172/7 |
| 4,814,909 | 3/1989 | Brown et al. | 360/78.07 |
| 4,931,967 | 6/1990 | Boe et al. | 364/571.01 |
| 4,964,014 | 10/1990 | Boe et al. | 361/187 |
| 5,012,415 | 4/1991 | Boe et al. | |
| 5,244,066 | 9/1993 | Mackoway et al. | |
| 5,249,422 | 10/1993 | Smith et al. | 60/426 |
| 5,343,775 | 9/1994 | Easton et al. | |
| 5,455,769 | 10/1995 | Panoushek et al. | 364/424.07 |
| 5,472,056 | 12/1995 | Orbach | 172/2 |
| 5,666,806 | 9/1997 | Dietz | 60/327 |
| 5,684,375 | 11/1997 | Chaffee et al. | 318/638 |
| 5,701,793 | 12/1997 | Gardner et al. | 91/361 |
| 5,742,921 | 4/1998 | Oo et al. | 701/102 |

FOREIGN PATENT DOCUMENTS 3910828 6/1990 Germany .

OTHER PUBLICATIONS

John Deere Operator's Manual for 8100, 8200, 8300 and 8400 Tractors, pp. 55–1 through 55–9, Jul. 1994.

*Primary Examiner*—Patrick Assouad
*Attorney, Agent, or Firm*—Foley & Lardner

[57] ABSTRACT

A method of generating a calibrated command signal in a control system including a command device is disclosed herein. The command device (e.g., a control lever) is moveable between predefined positions (e.g., detents). A sensing circuit generates a signal representing the position of the command device. The method includes the steps of calibrating the command device and then generating a calibrated command signal based upon the command device position. The calibrating step includes moving the command device to the predefined positions, converting the sensed position signals into calibration values and storing these values. The generating step includes moving the command device to an operating position, converting the sensed position signal into an operating position signal, and generating the calibrated command signal based upon the operating position signal and the calibration values. In one embodiment, the method is used to read the control levers for auxiliary valves in an auxiliary hydraulic system. The control lever is moveable between extend, neutral, retract and float positions, which causes the calibrated command signal to represent maximum extend, neutral, maximum retract and float flow rates, respectively. When the control lever is between the neutral position and either the extend or the retract position, the calibrated command signal is a proportional signal.

31 Claims, 18 Drawing Sheets

| | | | STATE | | | | | |
|---|---|---|---|---|---|---|---|---|
| | | Floating | Full Retracting | Proportional Retracting | Idle | Neutral | Proportional Extending | Full Extending | Dead |
| EVENT | Lever = Float* | No change | Floating | Full Retracting | No change | Proportional Retracting | Neutral | Proportional Extending | No change (NA²) |
| | Lever/Switch = Lower Detent | Full Retracting | No change | Full Retracting | No change | Proportional Retracting | Neutral | Proportional Extending | No change (NA²) |
| | Lever = Lower (Retract) Feel** | Full Retracting | Proportional Retracting | No change | No change | Proportional Retracting | Neutral | Proportional Extending | No change (NA²) |
| | Lever/Switch = Neutral | Full Retracting | Proportional Retracting | Neutral | Neutral | No change | Neutral | Proportional Extending | No change (NA²) |
| | Lever = Raise (Extend) Feel** | Full Retracting | Proportional Retracting | Neutral | No change | Proportional Extending | No change | Proportional Extending | No change (NA²) |
| | Lever/Switch = Raise Detent | Full Retracting | Proportional Retracting | Neutral | No change | Proportional Extending | Full Extending | No change | No change (NA²) |
| | Transport Lock Engaged | Idle | Idle | Idle | No change | Idle | Idle | Idle | No change (NA²) |
| | Auto Kick-Out Triggered | No change (NA¹) | Idle | No change (NA¹) | No change (NA¹) | No change (NA¹) | No change (NA¹) | Idle | No change (NA²) |
| | Feedback position = Retract setpoint** | No change | Idle | No change | No change | No change | No change | No change | No change (NA²) |
| | Feedback position = Extend setpoint** | No change | No change | No change | No change | No change | No change | Idle | No change (NA²) |
| | Lever/Switch Out of Range | Dead | Dead | Dead | Dead | Dead | Dead | Dead | No change (NA²) |
| | Driver Circuitry Failure | Dead | Dead | Dead | Dead | Dead | Dead | Dead | No change (NA²) |

\* -- These events are only possible for Auxiliary Valves 1 through 4.
\*\* -- These events only apply to Auxiliary Valve 1.
NA¹ -- Not Applicable: The Auto Kick-Out events only applies to states corresponding to detent events.
NA² -- Not Applicable: Once a valve is Dead, it stays Dead (until the next power up). Therefore, there is no reason to continue to check the valve's events or circuitry.

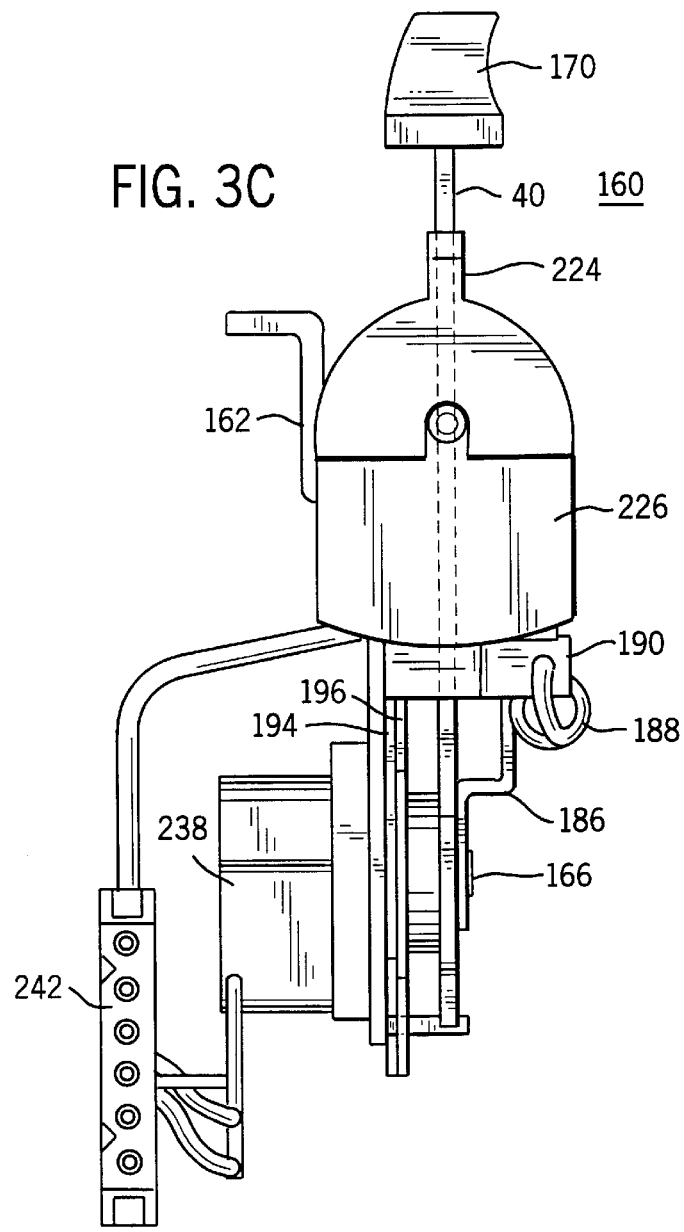
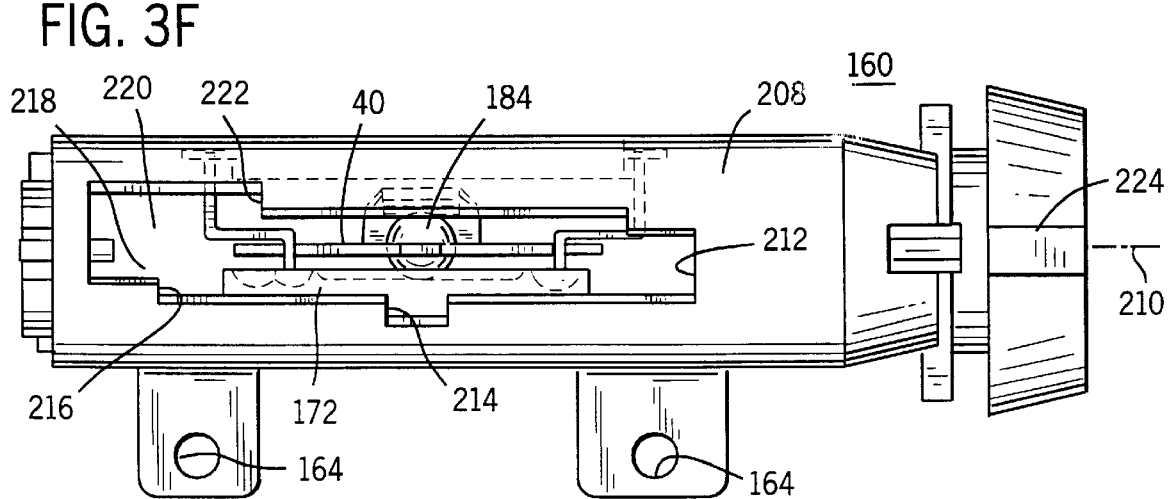

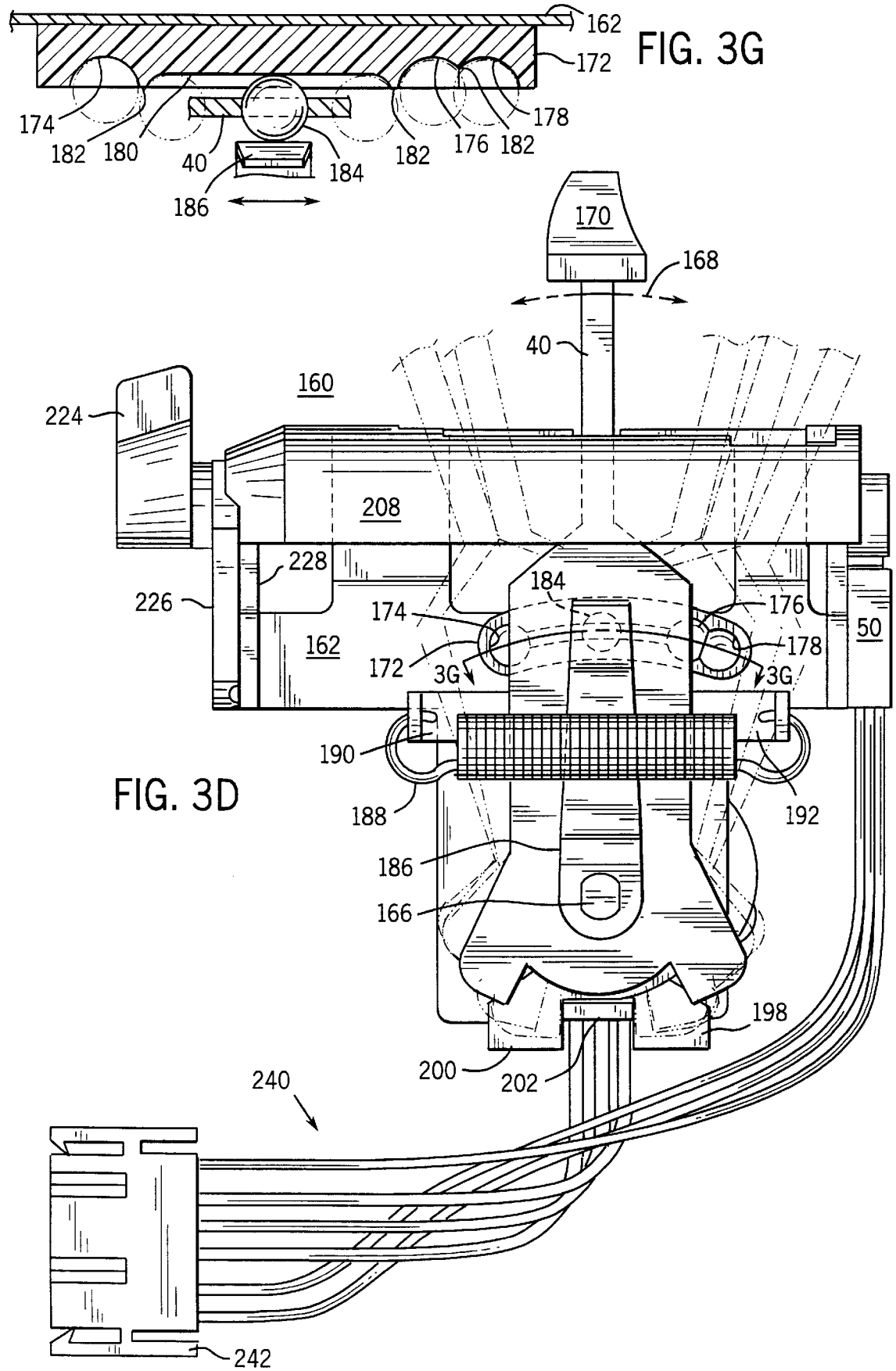

FIG. 10

| EVENT | STATE | | | | | | | |
|---|---|---|---|---|---|---|---|---|
| | Floating | Full Retracting | Proportional Retracting | Idle | Neutral | Proportional Extending | Full Extending | Dead |
| Lever = Float * | Floating | No change | Full Retracting | No change | Proportional Retracting | Neutral | Proportional Extending | No change (NA²) |
| Lever/Switch = Lower Detent | Floating | No change | Full Retracting | No change | Proportional Retracting | Neutral | Proportional Extending | No change (NA²) |
| Lever = Lower (Retract) Feel * | Full Retracting | Proportional Retracting | No change | Neutral | Proportional Retracting | Neutral | Proportional Extending | No change (NA²) |
| Lever/Switch = Neutral | Full Retracting | Proportional Retracting | Neutral | Neutral | No change | Neutral | Proportional Extending | No change (NA²) |
| Lever = Raise (Extend) Feel * | Full Retracting | Proportional Retracting | Neutral | No change | Proportional Extending | No change | Proportional Extending | No change (NA²) |
| Lever/Switch = Raise Detent | Full Retracting | Proportional Retracting | Neutral | No change | Proportional Extending | Full Extending | No change | No change (NA²) |
| Transport Lock Engaged | Idle | Idle | Idle | No change | Idle | Idle | Idle | No change (NA²) |
| Auto Kick-Out Triggered | No change (NA¹) | No change (NA¹) | No change (NA¹) | No change (NA¹) | No change (NA¹) | No change (NA¹) | Idle | No change (NA²) |
| Feedback position = Retract setpoint ** | No change | Idle | No change | No change | No change | No change | No change | No change (NA²) |
| Feedback position = Extend setpoint ** | No change | No change | No change | No change | Full Extending | No change | Idle | No change (NA²) |
| Lever/Switch Out of Range | Dead | Dead | Dead | Dead | Dead | Dead | Dead | No change (NA²) |
| Driver Circuitry Failure | Dead | Dead | Dead | Dead | Dead | Dead | Dead | No change (NA²) |

\* -- These events are only possible for Auxiliary Valves 1 through 4.
\*\* -- These events only apply to Auxiliary Valve 1.
NA¹ -- Not Applicable: The Auto Kick-Out events only applies to states corresponding to detent events.
NA² -- Not Applicable: Once a valve is Dead, it stays Dead (until the next power up). Therefore, there is no reason to continue to check the valve's events or circuitry.

EEPROM memory map for calibration/configuration values.

| Location | Contents |
|---|---|
| CAL_POS_CMD_UP | a/d reading when pos_cmd lever is all the way up |
| CAL_POS_CMD_DOWN | a/d reading when pos_cmd lever is all the way down |
| CAL_THROTTLE_UP | a/d reading when throttle lever is all the way up |
| CAL_THROTTLE_DOWN | a/d reading when throttle lever is all the way down |
| CAL_AUX1_RETRACT | a/d reading when AUX1_lever is in the Retract position |
| CAL_AUX1_EXTEND | a/d reading when AUX1_lever is in the Extend position |
| CAL_AUX2_RETRACT | a/d reading when AUX2_lever is in the Retract position |
| CAL_AUX2_EXTEND | a/d reading when AUX2_lever is in the Extend position |
| CAL_AUX3_RETRACT | a/d reading when AUX3_lever is in the Retract position |
| CAL_AUX3_EXTEND | a/d reading when AUX3_lever is in the Extend position |
| CAL_AUX4_RETRACT | a/d reading when AUX4_lever is in the Retract position |
| CAL_AUX4_EXTEND | a/d reading when AUX4_lever is in the Extend position |
| CONFIG | configuration bits which the ARU stores |
| EDC_Draft | set: load cmd. pot is present during Position cmd lever calibration<br>clear: load cmd. pot is absent during Position cmd lever calibration |
| AUX5_Present | set: AUX5 switch is active during AUX pots calibration<br>clear: AUX5 switch is inactive during AUX pots calibration |
| MFD_Present | set: 'Yes' option is selected during MFD configuration<br>clear: 'No' option is selected during MFD configuration |
| CAL_CHKSUM | inverse of modulo 65536 addition of the above cal/config values |

FIG. 11

CALIBRATION OF A COMMAND DEVICE IN CONTROL SYSTEM

FIELD OF THE INVENTION

The present invention relates generally to generating command signals in a control system including a command device. In particular, the present invention relates to a method of generating a calibrated command signal which includes the steps of calibrating a command device by moving the command device into predefined positions and storing sensed calibration values representative of the positions, and generating a calibrated command signal by moving the command device into an operating position and comparing an operating position signal representative of the operating position to the calibration values.

BACKGROUND OF THE INVENTION

Working vehicles often include auxiliary hydraulic systems configured to supply pressurized hydraulic fluid from a vehicle hydraulic pump to auxiliary equipment or attachments. For example, agricultural and construction equipment vehicles (e.g., tractors; tractor-loaders; skid-steer loaders) may be coupled to attachments such as augers, grapples, sweepers, landscape rakes, backhoes, scarfers, snowblowers, stabilizers, raising and lowering implements or other attachments driven by hydraulic actuators such as hydraulic cylinders or hydraulic motors.

The attachments can be referred to as "auxiliary" equipment since they are typically connected to a vehicle to perform a particular job, and then disconnected when the job is complete. Accordingly, the working vehicles include external fluid fittings to faciliate connecting and disconnecting the hydraulic fluid supply lines of the attachments to the vehicles' auxiliary hydraulic systems. The auxiliary hydraulic systems include valves configured to control the supply of hydraulic fluid flowing through the fittings. The use of auxiliary equipment increases versatility of working vehicles by allowing the vehicles to perform different functions at different times.

Different attachments impose varying requirements on auxiliary hydraulic systems with respect to timing, rate and control of fluid flow. For example, an attachment equipped with a hydraulic motor (e.g., auger) may require a continuous flow of fluid while an attachment equipped with a hydraulic cylinder actuator (e.g., plow) may only require a flow of fluid for a discrete period. A desired rate of flow may depend upon the weight of an implement or on the work being performed by an attachment. For example, the flow rate required to raise an implement at a desired speed (e.g., fast enough for efficiency yet slow enough for safety) may be higher for a relatively heavy implement than for a relatively light implement. Closed-loop control based upon feedback signals may or may not be required. For example, a plow can be raised and lowered between desired raise and lower positions by a hydraulic cylinder actuator based on position feedback signals while a landscape rake may be raised or lowered by applying a fluid flow for a period sufficient to fully raise or lower the rake. Further, an auxiliary hydraulic system may be required to supply fluid to an attachment at a maximum flow rate in some situations and at a "feathered" flow rate (e.g., proportional control) in other situations such as during precision operations.

An auxiliary hydraulic system may also be required to provide hydraulic fluid flows to a number of auxiliary attachments having different fluid flow timing, rate and control requirements. For example, a tractor could be required to provide hydraulic fluid to simultaneously raise and lower a plow based upon position feedback signals, raise and lower a rake, and drive an auger.

Accordingly, it would be advantageous to provide an improved auxiliary hydraulic system capable of providing pressurized fluid to attachments in continuous or timed modes, of providing fluid to attachments at flow rates which can be set by an operator, of providing fluid to certain attachments using closed-loop control based upon feedback signals, and of providing fluid to attachments at maximum or feathered flow rates. Further, it would be advantageous to provide an improved auxiliary hydraulic system for supplying pressurized fluid to attachments having varying timing, rate and control requirements.

It would also be advantageous to provide an improved method of reading the position of a command device in an auxiliary hydraulic control system or any other type of control system. Advantages which can be realized by the improved method disclosed herein include accurately reading an operating position of a command device (e.g., a control lever) which can be moved between predefined positions (e.g., detents). The method can generate a calibrated command signal representing a predetermined command value such as a neutral command value or a command limit when the command device is moved into a corresponding predefined position. The method can further generate a calibrated command signal representing a proportional command value when the command device is between the predefined positions. The method can also generate an accurate position signal without the need for a high-accuracy potentiometer coupled to the command device. Further, the method can determine when a control system is configured with a particular command device.

SUMMARY OF THE INVENTION

One embodiment of the invention provides a method of generating a calibrated command signal in a control system. The control system includes at least one command device moveable between first and second predefined positions, and a position sense circuit coupled to the command device and configured to generate a position signal representative of the position of the command device. The method includes (a) calibrating the command device by (1) moving the command device into the first predefined position, converting the resulting position signal into a first calibration value, and storing the first calibration value in a memory circuit, and (2) moving the command device into the second predefined position, converting the resulting position signal into a second calibration value, and storing the second calibration value in the memory circuit. The method further includes (b) after step (a), generating a calibrated command signal by (1) moving the command device into an operating position, and converting the resulting position signal into an operating position signal, and (2) generating the calibrated command signal based upon the operating position signal, the first calibration value and the second calibration value. The calibrated command signal represents a first and a second predetermined command value when the operating position signal is within a first and a second deadband defined about the first and the second calibration value, respectively.

Another embodiment of the invention provides a method of generating a calibrated command signal in a control system. The control system includes at least one command device moveable between first detent, neutral and second detent positions, and includes a position sense circuit coupled to the command device and configured to generate a position signal representative of the position of the command device. The method includes (a) calibrating the command device by (1) moving the command device into the first detent position, converting the resulting position signal into a first calibration value, and storing the first calibration value in a memory circuit, and (2) moving the command device into the second detent position, converting the resulting position signal into a second calibration value, and storing the second calibration value in the memory circuit. The method further includes (b) after step (a), generating a calibrated command signal by (1) moving the command device into an operating position, and converting the resulting position signal into an operating position signal, and (2) generating the calibrated command signal based upon the operating position signal, the first calibration value, a neutral value representing the neutral position of the command device, and the second calibration value.

Another embodiment of the invention provides a method of generating a calibrated command signal in an auxiliary hydraulic control system including a plurality of control levers and auxiliary valves. Each control lever is moveable between extend detent, neutral, retract detent and float detent positions, the float detent position being beyond one of the extend detent and retract detent positions. The auxiliary hydraulic control system further includes a plurality of position sense circuits coupled to the control levers for generating position signals representative of the positions of the control levers. The method includes (a) calibrating each control lever by: (1) moving the control lever into the extend detent position, converting the resulting position signal into an extend calibration value, and storing the extend calibration value in a memory circuit, and (2) moving the control lever into the retract detent position, converting the resulting position signal into a retract calibration value, and storing the retract calibration value in the memory circuit. The method further includes (b) after step (a), generating a calibrated command signal based upon the position of each control lever by (1) moving the control lever into an operating position, and converting the resulting position signal into an operating position signal, and (2) generating the calibrated command signal based upon the operating position signal, the extend calibration value, a neutral value representing the neutral position of the control lever, and the retract calibration value.

BRIEF DESCRIPTION OF THE DRAWINGS

The invention will become more fully understood from the following detailed description, taken in conjunction with the accompanying drawings, wherein like reference numerals refer to like parts, in which:

FIGS. 3A–3G are views of each valve control lever assembly of FIG. 2 including (A) a front perspective view, (B) a rear perspective view, (C) a front plan view, (D) a right-side plan view, (E) a bottom plan view, (F) a top plan view, and (G) a sectional view taken along line 3G—3G in FIG. 3D;

FIG. 10 is a state event table showing how the state values for the auxiliary valves are updated;

FIG. 11 is a memory map showing the calibration and configuration values in non-volatile memory within the armrest control unit shown in FIG. 1;

DETAILED DESCRIPTION OF THE PREFERRED EMBODIMENTS

Figure 1:
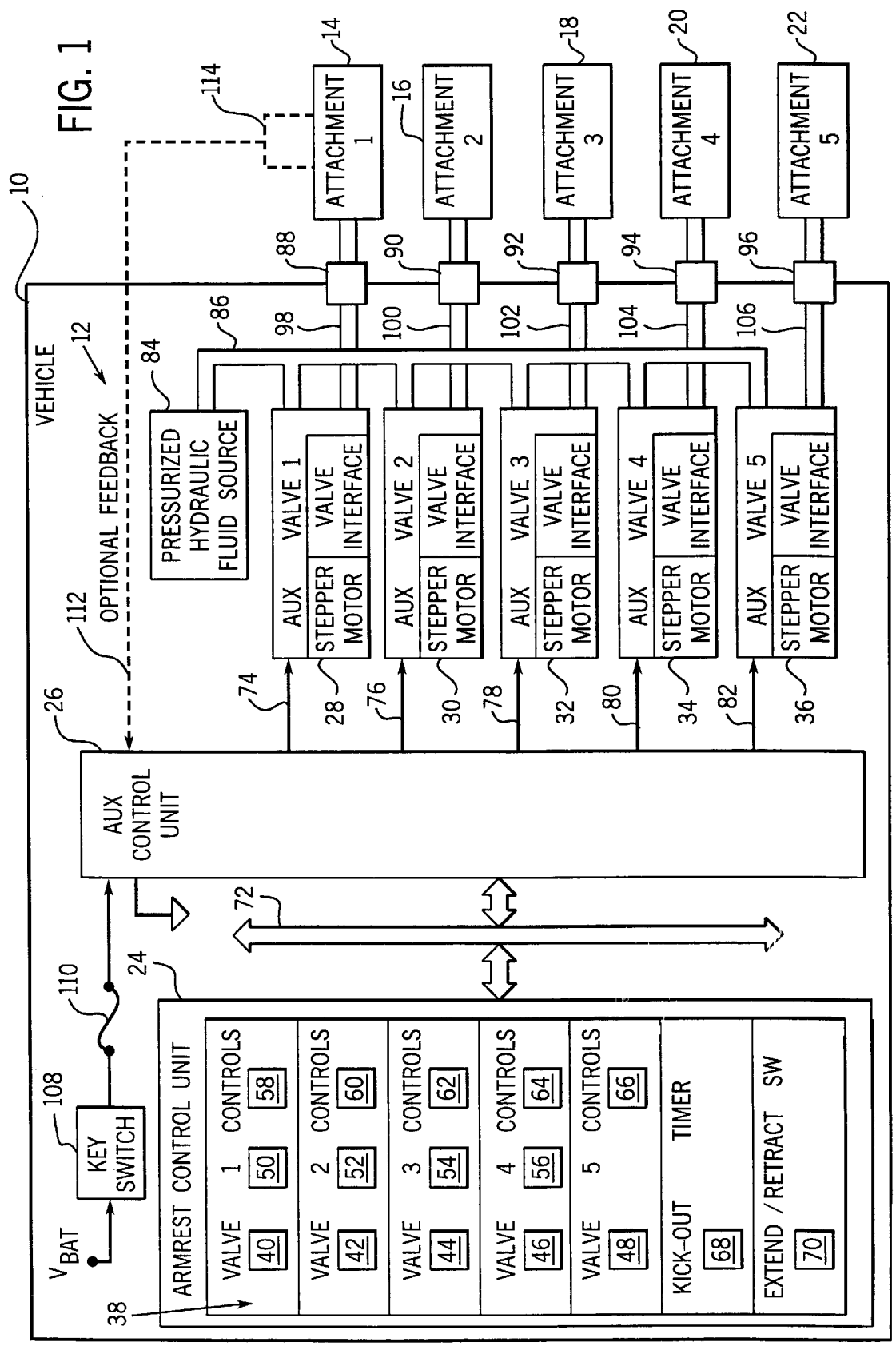
FIG. 1 is a block diagram representing a working vehicle equipped with an auxiliary hydraulic system for supplying pressurized hydraulic fluid to attachments, the auxiliary hydraulic system including an armrest control unit, an auxiliary control unit and auxiliary valves.

Referring to FIG. 1, a working vehicle 10 is equipped with an auxiliary hydraulic system 12 for supplying pressurized hydraulic fluid to attachments 14–22. Working vehicle 10 can be an agricultural or construction equipment vehicle and attachments 14–22 include hydraulic actuators having independent hydraulic fluid flow timing, rate and control requirements.

Auxiliary hydraulic system 12 includes an armrest control unit 24, an auxiliary control unit 26 and auxiliary valve assemblies 28–36. Armrest control unit 24 is mounted at an operator station of the vehicle (e.g., cab) and includes various input or command devices 38 configured to generate electrical command signals. Command devices 38 include valve control levers 40–46 for controlling the flow of fluid through auxiliary valve assemblies 28–34, respectively, a valve control switch 48 for controlling the flow through auxiliary valve assembly 36, automatic kick-out timer disable switches 50–56 for disabling an automatic kick-out function for valve assemblies 28–34, flow limit control knobs 58–66 for setting flow limits for valve assemblies 28–36, a kick-out timer set knob 68 for setting an automatic kick-out time period for valve assemblies 28–36, and an extend and retract limit switch 70 for setting extend/retract limits for attachment 14.

Potentiometers associated with valve control levers 40–46, flow limit control knobs 58–66, and kick-out timer set knob 68 generate electrical signals representing the position of the respective lever or knob. Valve control switch 48 is a three-position switch with extend, neutral and retract positions. Kick-out timer disable switches 50–56 are two-position switches with non-continuous (or timed) and continuous (or motor) positions. Extend and retract limit switch 70 is a three-position switch with extend limit, neutral and retract limit positions.

Armrest control unit 24 generates command signals which reflect the settings of command devices 38, and transmits the command signals via a vehicle data bus 72 to other vehicle systems. Preferably, bus 72 conforms to the standards of SAE J-1939 ("Recommended Practice for a Serial Control and Communications Vehicle Network").

Auxiliary control unit 26 receives the command signals from bus 72, generates valve control signals on conductors 74–82 from the command signals, and applies the control signals via conductors 74–82 to valve assemblies 28–36. Valve assemblies 28–36 also receive a flow of pressurized hydraulic fluid from a source 84 (e.g., a pump) via fluid hoses or conduits 86, and supply a flow of pressurized fluid to each auxiliary hydraulic fitting 88–96 via hoses 98–106 in response to the control signals on conductors 74–82. Auxiliary hydraulic fittings 88–96 are configured for easy connection and disconnection to attachments 14–22. The fluid supply network between auxiliary hydraulic system 12 and attachments 14–22 can have other configurations such as using multiple hoses for each attachment.

In one embodiment, each auxiliary valve assembly 28–36 includes a stepper motor, a valve interface or backcap operated by the stepper motor and a valve fluidly coupled between source 84 and the respective fitting 88–96.

The stepper motors receive power and control signals 74–82 from auxiliary control unit 26. Each stepper motor includes a rotor driven by two direct current (DC) phases or coils controlled by four control lines. The rotor is rotated in steps (e.g., ¼ revolution/step) in either direction in response to changes in the polarity of the coils. The number of steps needed for the valve to reach a desired valve position is controlled by a stepper motor controller (FIG. 8) in response to the command signals from armrest control unit 24.

The valve interface in each valve assembly 28–36 includes a worm gear driven by the rotor and coupled to the valve. Rotation of the rotor causes the worm gear to push or pull on the valve, thereby opening or closing the valve and changing the flow of fluid through the valve. The valve is moved into a desired position by tracking the number of steps. For example, the valve is moved into float position after a predetermined number of steps (e.g., 270 steps or 270 quarter rotations of the worm drive). Such stepper motors are available from Applied Motion, and systems for controlling the positioning of valves using stepper motors are available from Commercial Intertech. Alternatively, valve positions could be controlled using sensed valve position feedback signals.

Auxiliary control unit 26 receives electrical power from the vehicle battery through an ignition key switch 108 and a fuse 110. Auxiliary control unit 26 may also receive a feedback signal via line 112 from an optional sensor 114 coupled to attachment 14. Sensor 114 may be, for example, a cylinder position sensor (e.g., LVDT or potentiometer) configured to sense the position of a hydraulic cylinder in attachment 14. Feedback signal 112 can be used by auxiliary control unit 26 as a control input in a cylinder position mode of operation wherein the fluid flow is controlled to move a cylinder between extend and retract positions set by limit switch 70.

Figure 2:
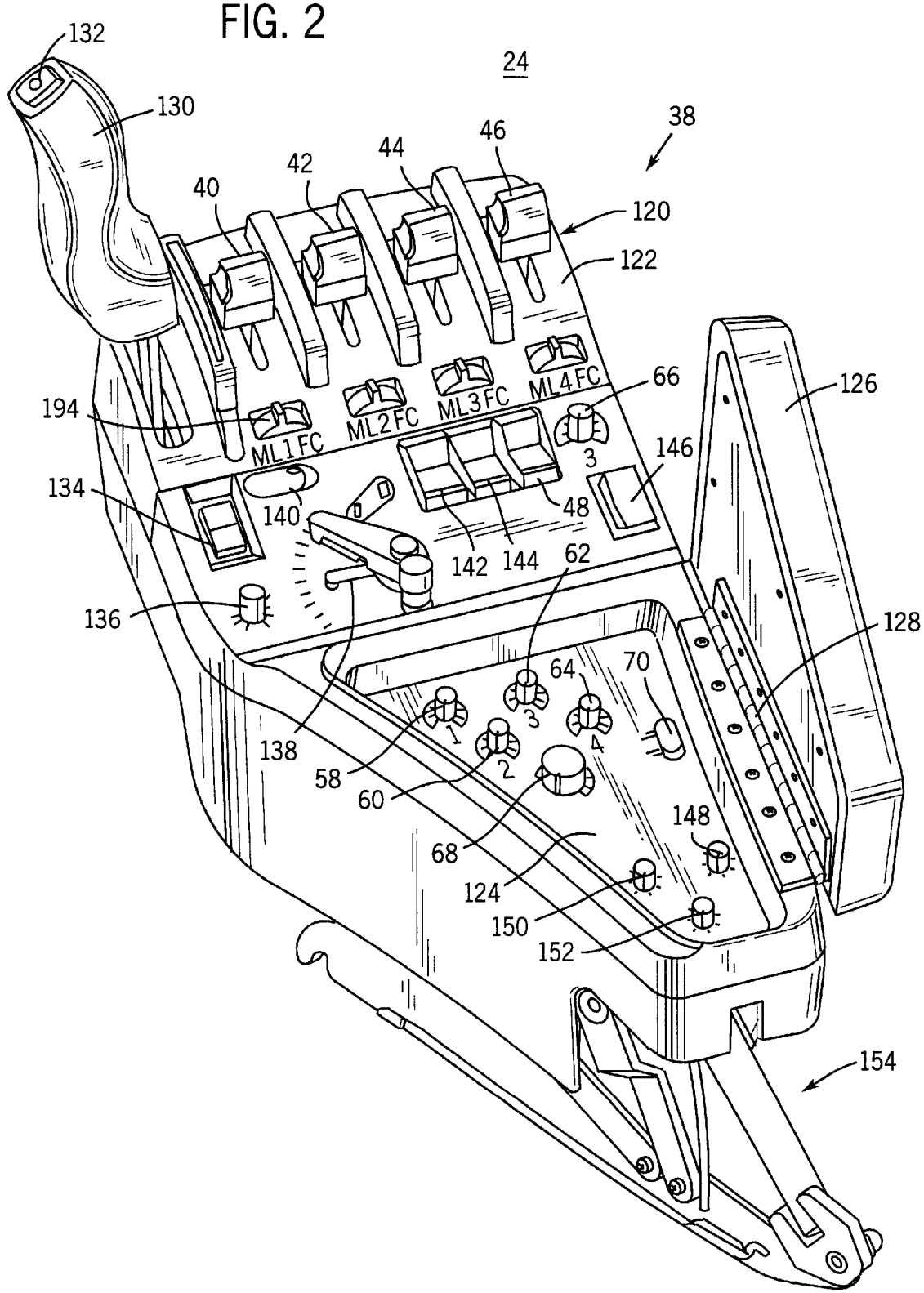
FIG. 2 is a perspective view of the armrest control unit of FIG. 1 which shows command devices for the auxiliary hydraulic system including valve control lever assemblies with kick-out timer disable switches, a valve control switch, flow limit control knobs, a kick-out timer set knob, and an extend/retract limit switch.

Referring to FIG. 2, command devices 38 are mounted to a console cover 120 of armrest control unit 24 for convenient operator access (kick-out timer disable switches 50–56 are internal to armrest control unit 24 and, thus, are not visible in FIG. 2). Alternatively, an operator control console configured differently from armrest control unit 24 can be used. Console cover 120 has two surface portions 122 and 124. A moveable cover 126 rotates about a hinge 128 to cover surface portion 124 and the command devices 38 mounted on second surface portion 124 (e.g., flow limit control knobs 58–64; limit switch 70). Cover 126 prevents accidental movement of the covered command devices, simplifies the interface presented to the operator during normal operation, and provides an armrest for the operator's comfort.

Armrest control unit 24 may also include command devices for controlling other functions of vehicle 10. For example, armrest control unit 24 may include a throttle control 130 with a bump switch 132, a hitch up/down switch 134, a hitch draft force potentiometer 136, a hitch position control 138, a creeper switch 140, a mechanical front-wheel drive (MFD) switch 142, a differential lock (DL) switch 144, a power take-off (PTO) switch 146, and hitch travel, drop speed and upper limit potentiometers 148–152. Signals from these command devices may also be transmitted by armrest control unit 24 via vehicle data bus 72. Armrest control unit 24 may be adjustably positioned relative to the operator's seat by assembly 154 for the convenience of the operator.

The high degree of integration of command devices 38 in armrest control unit 24 provides a convenient and inexpensive operator interface to the various control systems of vehicle 10. For example, an operator can fully control auxiliary hydraulic system 12 from a single console, and the expense and inconvenience associated with additional control panels are avoided.

Referring to FIGS. 3A–3G, each valve control lever 40–46 is a part of a control lever assembly 160 mounted beneath console cover 120 by a frame or bracket 162. Bracket 162 includes extended members having bolt holes 164 to facilitate attachment to console cover 120 such that control levers 40–46 extend above the cover through an elongated passage. Alternatively, bracket 162 can be mounted to an internal frame beneath console cover 120.

A first end of control lever 40 is rotatably mounted to bracket 162 by a pivot 166. Thus, linear movement of control lever 40 within the elongated passage defined by console cover 120 causes a second end of control lever 40 to move along arc 168. The second end of control lever 40 extends above console cover 120 and is connected to a handle or knob 170.

Control lever 40 moves along a detent plate or track 172 attached to bracket 162. Lever detent recesses 174–178 are defined within track 172, and are connected by a recessed sliding pathway or groove 180. Track 172 is preferably made of plastic, and track 172 includes raised portions or bumps 182 adjacent to recesses 174–178 for increasing the force required to move control lever 40 into and out of recesses 174–178. Extend or raise detent recess 174 is at the front of track 172, retract or lower detent recess 176 is near the rear of track 172 and float detent recess 178 is beyond retract detent recess 176. Bumps 182 give a tactile feel that a detent position is imminent.

A protrusion 184 associated with control lever 40 is guided by track 172 to move within extend detent recess 174 when control lever 40 is moved to an extend or raise detent position, retract detent recess 176 when control lever 40 is moved to a retract or lower detent position, and float detent recess 178 when control lever 40 is moved to a float position. Protrusion 184 is otherwise guided along groove 180 when control lever 40 is in a proportional extend, neutral or proportional retract position. Preferably, protrusion 184 is a metal or plastic ball located within an aperture of control lever 40 and biased against track 172 by a detent spring 186.

Control lever 40 is biased into a neutral position between recesses 174 and 176 by a centering spring 188 coupled to bracket 162. Preferably, spring 188 connects between supports 190 and 192 extending from plates 194 and 196, respectively. Plates 194 and 196 are adjacent to each other between control lever 40 and bracket 162, and are rotatable about pivot 166 as control lever 40 pushes against the respective support. Plates 194 and 196 include stop members 198 and 200, respectively, which contact a stop 202 extending from bracket 162 to prevent supports 190 and 192 from rotating in the clockwise and counter-clockwise directions, respectively, in FIG. 3D. Control lever 40 includes a pair of stopping members 204 and 206 which contact stop 202 to prevent the rotation of the control lever past the extend detent and float detent positions. Alternatively, track 172 could include a neutral detent recess between recesses 174 and 176 for receiving protrusion 184 to define a neutral position.

Control lever assembly 160 also includes a control lever guide or lever lock assembly 208 rotatably mounted to bracket 162. The axis of rotation 210 (FIG. 3F) is parallel to the direction of linear movement of control lever 40. Guide 208 has a cylindrical, elongated center portion between two ends, and is made of injection-molded nylon. An opening 212 through the center portion has adjacent longitudinal slots 214–222 of different lengths along the direction of linear movement of lever 40. The front end of guide 208 includes an arm 224 projecting above console cover 120 (see FIG. 2). An operator can rotate guide 208 about axis 210 by applying a force to arm 224. Arm 224 can include an extending member or a thumbwheel.

A clutch plate 226 extends downwardly from the front end of guide 208 in parallel with a clutch plate 228 of bracket 162. Clutch plate 226 has five recesses 230 engageable with a protrusion 232 extending from clutch plate 228. Protrusion 232 is preferably a coined semisphere stamped into steel bracket 162. The detent mechanism formed by clutch plates 226 and 228 releasably retains guide 208 in one of five rotational positions as guide 208 rotates about axis 210, each rotational position corresponding to one longitudinal slot of opening 212. Since control lever 40 is moveable within the one slot, the range of linear movement of control lever 40 depends upon the rotational position of guide 208. Other types of detent mechanisms could also be used.

When arm 224 is in the LOCKED rotational position ("C" in FIG. 2), control lever 40 is retained against movement by slot 214 in the neutral position. When arm 224 is in FLOAT LOCKOUT position ("F"), slot 216 allows movement between the neutral, extend detent and retract detent positions but not into the float detent position. When arm 224 is in FULL TRAVEL position ("1"), slot 218 allows movement over the full range of travel along track 172. When arm 224 is in LOADER position ("L"), slot 220 allows movement over the full range of travel except for the extend detent position. Finally, when arm 224 is in MOTOR position ("M"), slot 222 allows movement only between the retract detent and float detent positions.

Figure 3A:
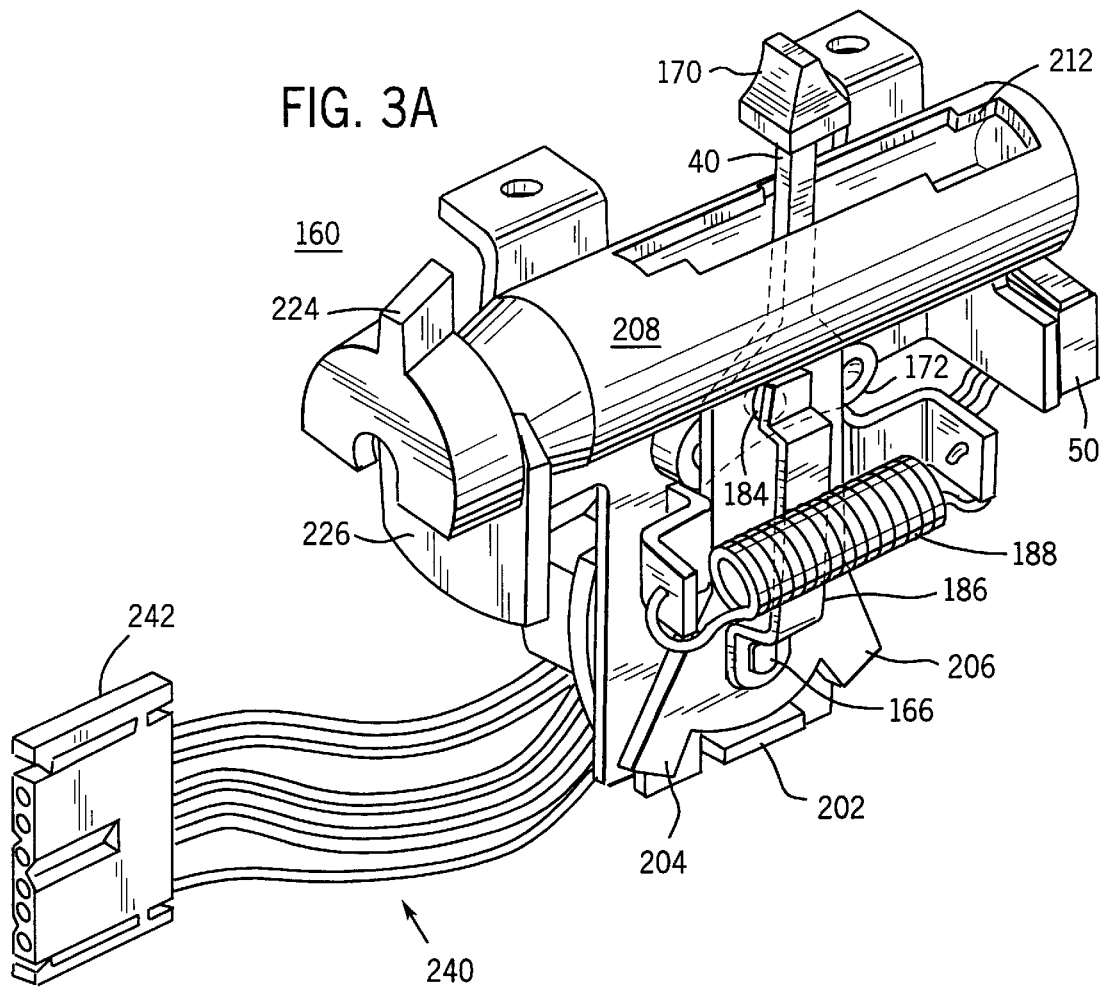
Figure 3E:
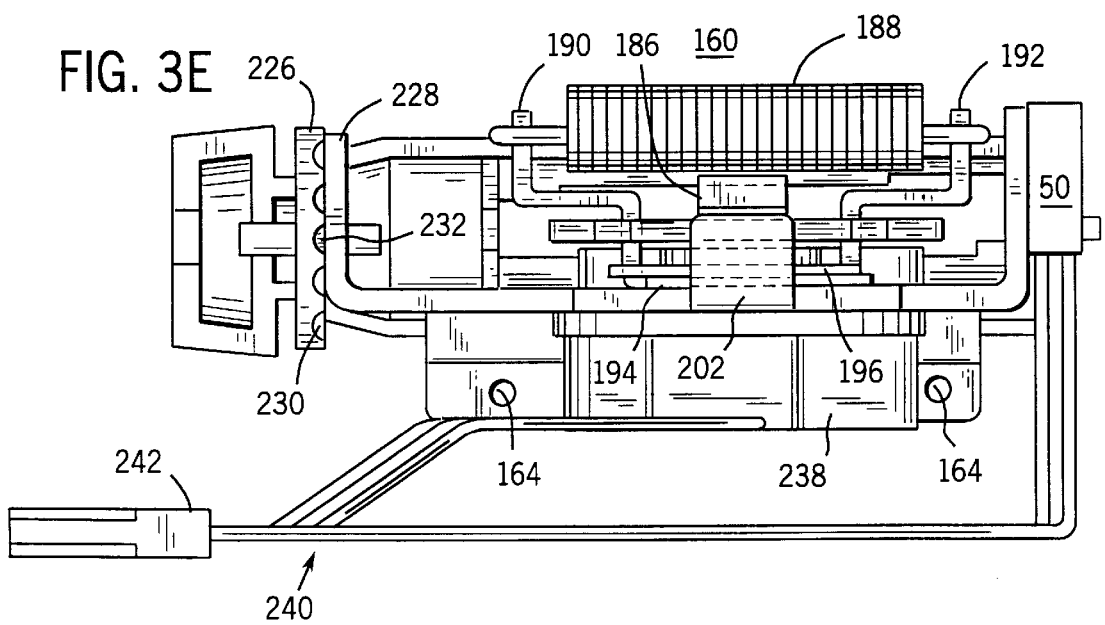
Figure 3B:
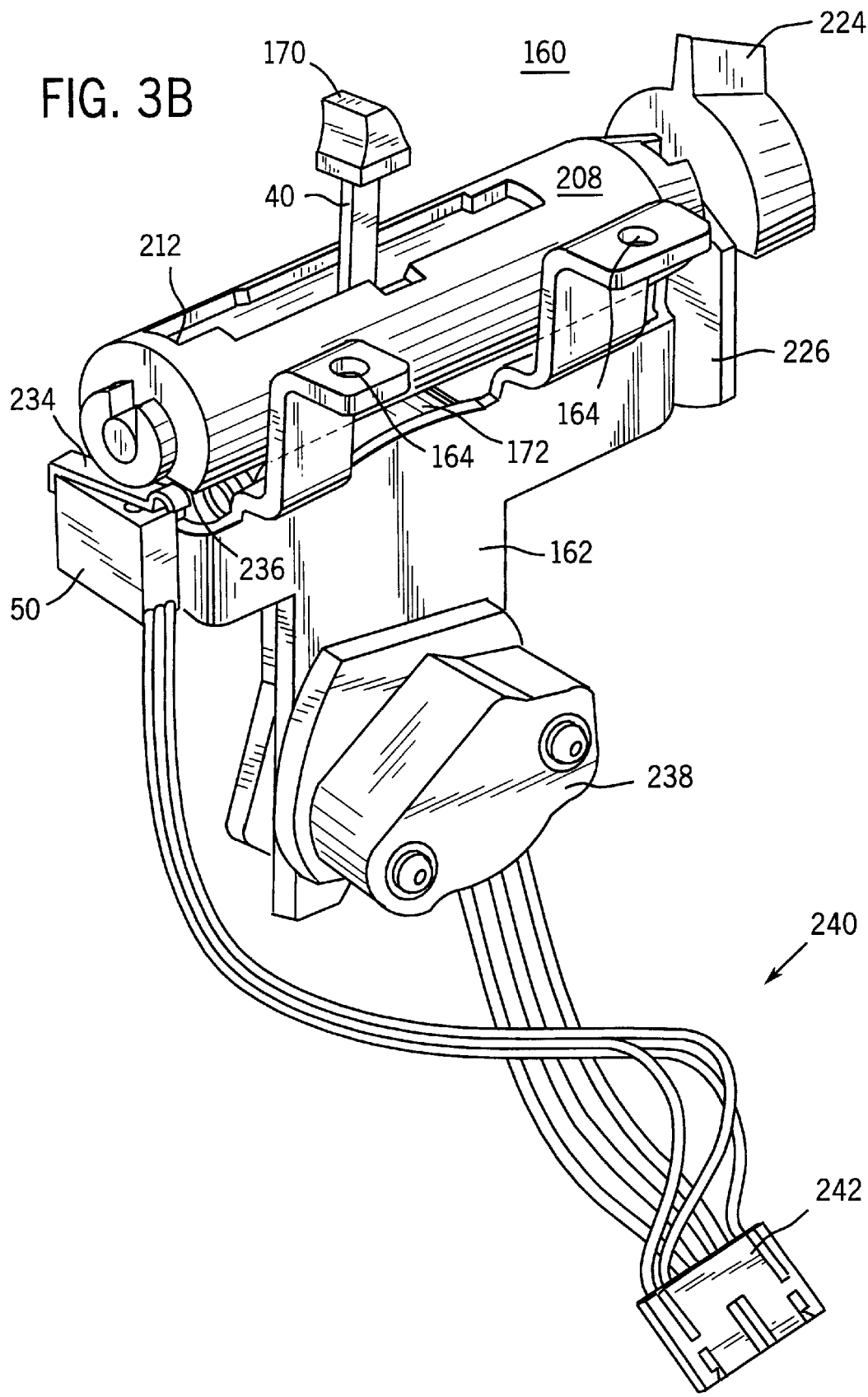

Control lever assembly 160 also includes kick-out timer disable switch 50 mounted to bracket 162. Switch 50 is a two-position micro-switch controlled by a lever 234 which is actuated by a cam 236 at the rear end of guide 208 (FIG. 3B). Cam 236 can be a lower edge of guide 208, or a member extending from guide 208, such that actuation of switch 50 depends upon the rotational position of guide 208. Switch 50 is normally open and is closed only in the MOTOR rotational position of guide 208, and is used to select between timed and continuous fluid flow. Microswitch 50 can be obtained, for example, from Burgess Inc.

Control lever assembly 160 also includes a sensing circuit 238 mounted to bracket 162 and coupled to control lever 40 for generating signals representing the control lever position. Sensing circuit 238 preferably includes a potentiometer (e.g., 4K ohm pot) coupled to pivot 166 and directly actuated by control lever 40. Sensing circuit 238 could also include a digital encoder which generates pulses or digital output signals, a variable capacitance sensing circuit, or an array of electrical detectors for sensing the control lever position.

Conductors 240 connect potentiometer 238 and switch 50 to an armrest control circuit (not shown in FIG. 3) via connector 242. The armrest control circuit provides excitation signals for reading potentiometer 238 (e.g., regulated +8V) and switch 50 (e.g., +12V switch power). However, control lever assembly 160 can be connected via connector 242 to other types of control systems.

Figure 4:
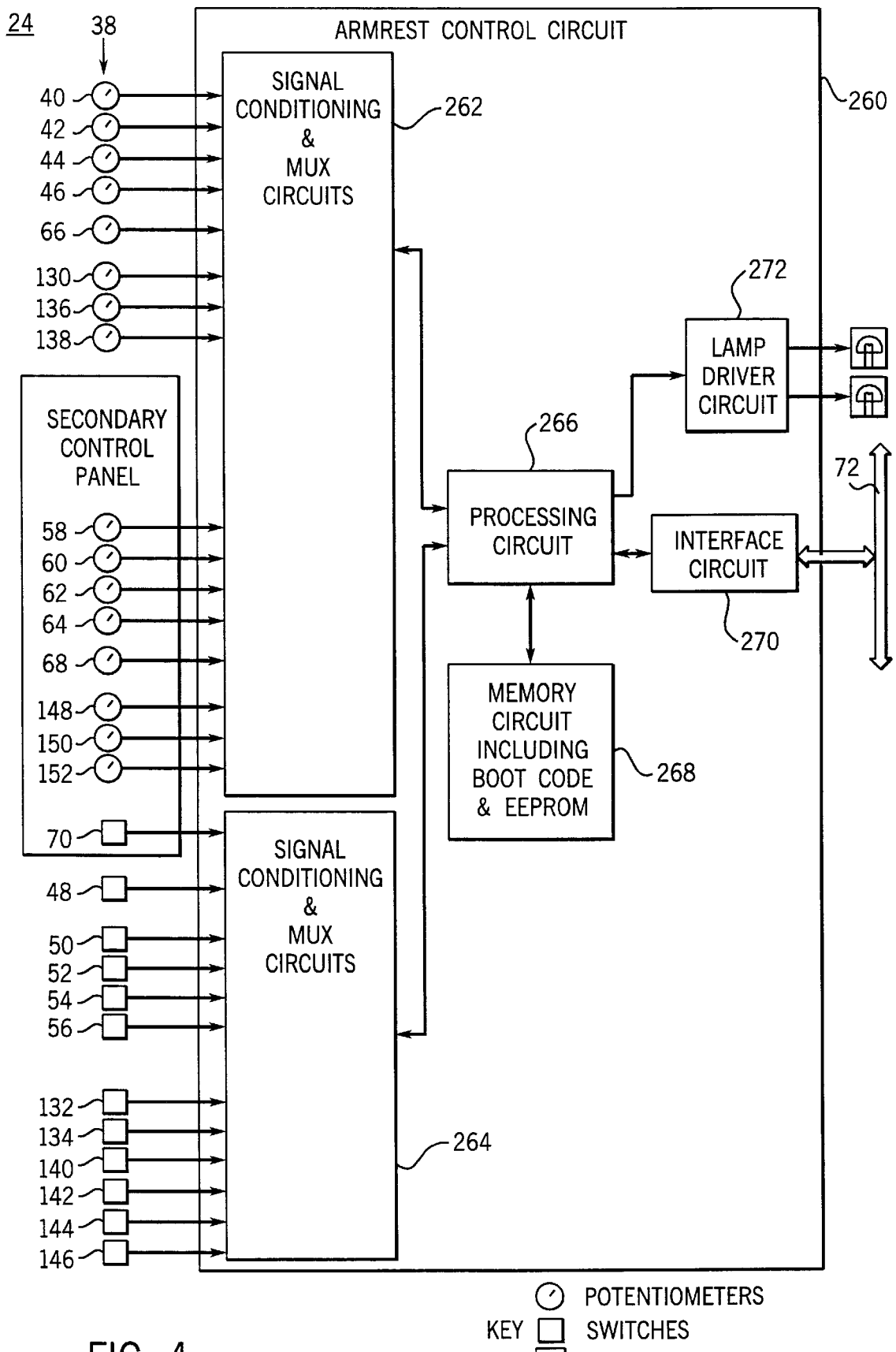
FIG. 4 is a block diagram of the armrest control unit of FIG. 1 which shows the command devices and an armrest control circuit.

Referring to FIG. 4, armrest control unit 24 includes a console control circuit 260 which receives signals from command devices 38, processes the signals, and transmits command signals onto data bus 72. Control circuit 260 includes signal conditioning and multiplexing circuits 262 and 264 for receiving the analog and digital command signals, respectively, a processing circuit 266 for processing the resulting analog and digital signals, a memory circuit 268 which may include volatile (e.g., RAM) and non-volatile (e.g., ROM, EPROM, EEPROM) memory for storing code (e.g., boot or operating code) and data (e.g., calibration/configuration data; variables). An interface circuit 270 is provided for communication via data bus 72, and a lamp driver circuit 272 is provided for driving status lamps (e.g., cylinder status).

Analog signal conditioning and multiplexer circuits 262 and 264 both include hardware filtering circuits for filtering the signals from command devices 38. Analog circuit 262 also includes analog switch circuits (e.g., HC4051N analog switches) for multiplexing the filtered signals. Digital circuit 264 also includes digital switches (e.g., 74HC299 8-bit shift/storage registers) to multiplex the filtered signals. Select signals for the multiplexers are provided by processing circuit 266.

Processing and memory circuits 266 and 268 include a processor (e.g., an 80C198 microcontroller from Intel) for reading the multiplexed signals. Analog signals are digitized using an analog-to-digital converter in the microcontroller. A combination interface circuit (e.g., a PSD312 from Wafer Scale Integration) provides RAM, ROM for boot and operating code, and logic for generating the select signals. FLASH memory (e.g., a 29C010 circuit) is also included.

Interface circuit 270 includes bus controller (e.g., an 82527) and CAN transceiver (e.g., 82C250) circuits for transmitting and receiving data from bus 72. Lamp driver 272 includes an LTC1485N circuit for driving system status lamps (e.g., slip; end-of-row; cylinder status).

Figure 5:
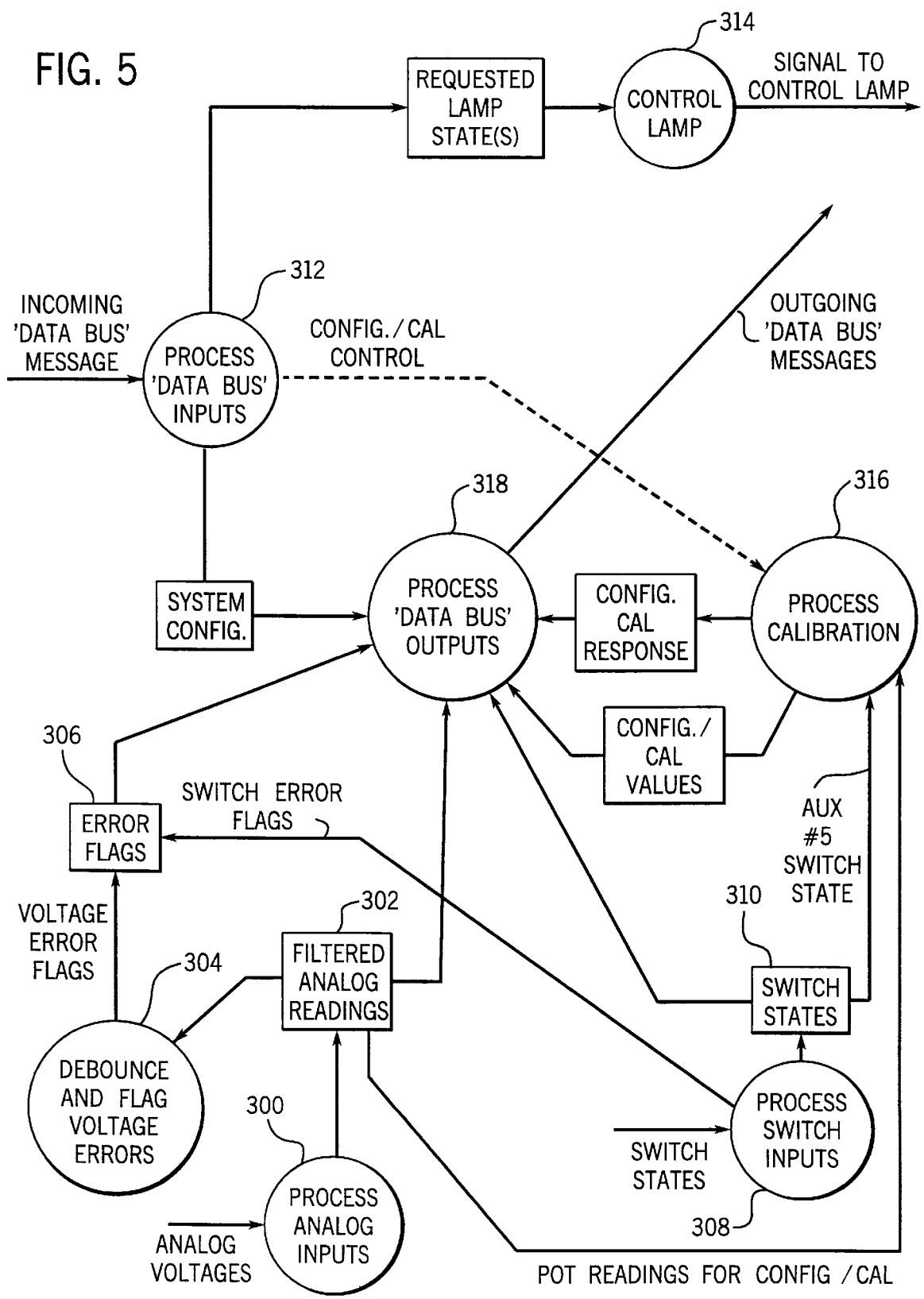
FIG. 5 is a process diagram for the processing circuit of the armrest control unit shown in FIG. 4.

Referring to FIG. 5, processing circuit 266 is programmed to perform the processes shown. In process 300, processing circuit 266 samples the digitized analog voltages from command devices 38 at a predetermined sample period (e.g., 10 msec). The digitized voltages are filtered and the filtered values are stored as filtered analog readings 302. In process 304, processing circuit 266 range checks filtered analog readings 302 and latches an error flag 306 for any signal which is out of range for a given amount of time (e.g., 250 msec).

In process 308, processing circuit 266 samples the status of the inputs from each switch command device 38 at a predetermined sample period (e.g., 10 msec). The status of the inputs from each switch are considered unchanged for a debounce time (e.g., 50 msec) after a change in status of any input from that switch. The status of the switches are stored as switch states 310.

Processing circuit 266 also checks the inputs from particular switches for conflicting signals. If inputs from a switch conflict for less than an error debounce time, the status of the inputs is considered to be the last valid status. However, if inputs from a particular switch conflict for more than the error debounce time, an error flag 306 is latched for the switch. For example, a conflict exists if the extend and the retract inputs from valve control switch 48 are both active. If the conflict exists for less than 250 msec, the status of the inputs is considered to be the last valid status. However, if the conflict remains for more than 250 msec, an error flag 306 is latched for valve control switch 48. For another example, a conflict exists if the extend and retract limit inputs from switch 70 are both active, and error flag 306 for switch 70 is latched after 250 msec.

In process 312, processing circuit 266 receives incoming messages from bus 72 such as lamp command data used to control the lamps in process 314. The incoming messages also include configuration data during normal operation and calibration/configuration control signals from an instrumentation control unit (ICU). In process 316, processing circuit 266 generates calibration and configuration data using filtered analog readings 302 and switch states 310 in response to the ICU control signals.

In process 318, processing circuit 266 generates outgoing messages for data bus 72 using filtered analog readings 302, switch states 310, error flags 306 and configuration/calibration data from processes 312 and 316. The outgoing messages include the debounced status of each switch, the switch error flags, and configuration data indicating whether any switches are not available (i.e., the system is not configured for these switches).

Figure 6:
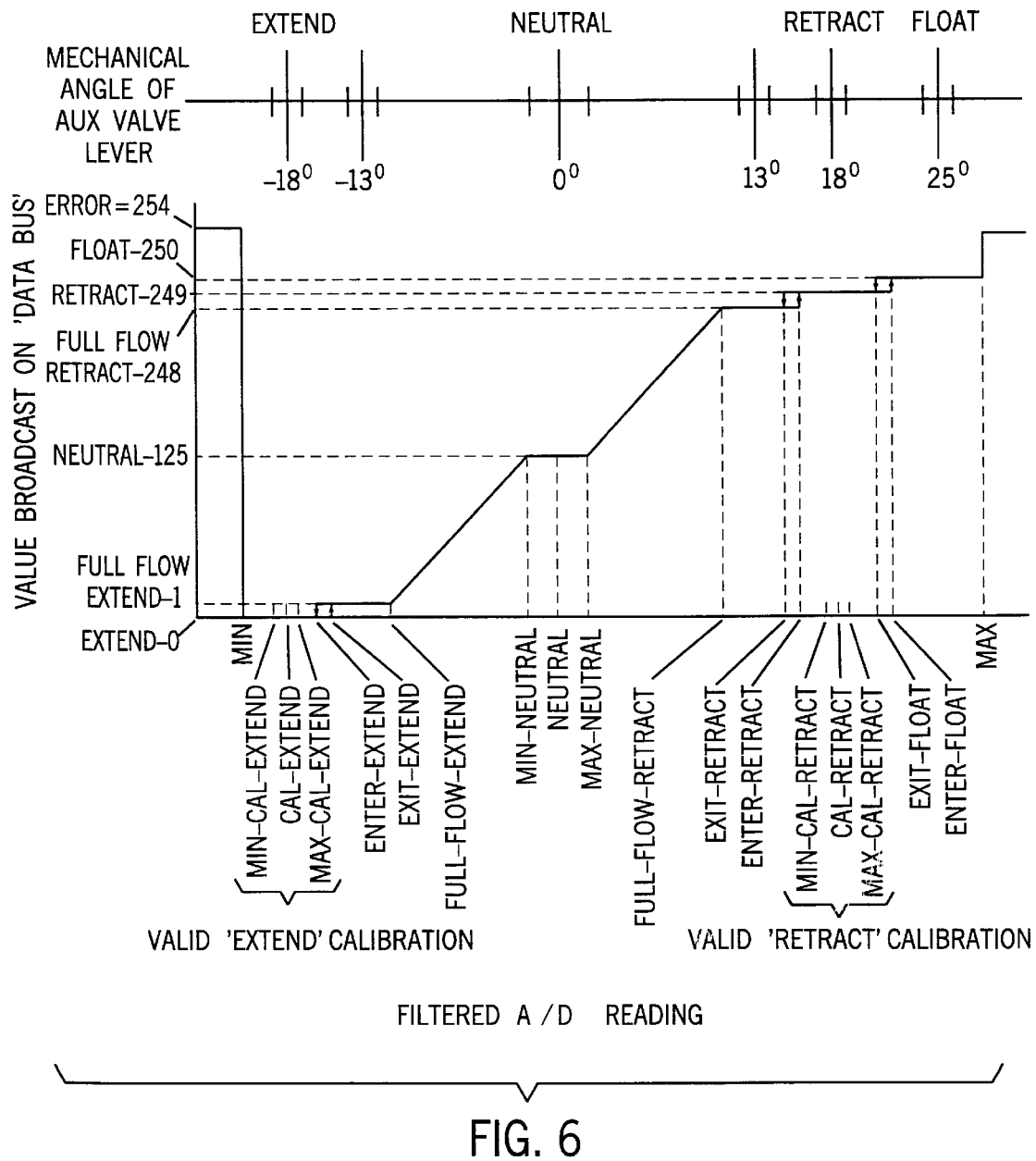
FIG. 6 shows scaling performed by the processing circuit of the armrest control unit to generate command signals from the auxiliary valve control lever positions.

Processing circuit 266 also scales the filtered analog readings 302 and transmits the scaled values in the outgoing data bus messages. The scaling provides accurate command signals even if relatively low accuracy potentiometers are used. The scaling of the filtered analog readings 302 for auxiliary valve control levers 40–46 is shown in FIG. 6.

The top plot shows the mechanical angle of control levers 40–46 at the extend, retract and float detent positions relative to the neutral position. Vertical bars surrounding each of these positions represents a deadband wherein the command value does not change.

The horizontal axis of the bottom graph shows the filtered analog reading and includes points representing minimum and maximum voltages expected to be read (MIN and MAX), minimum, ideal and maximum voltages expected when control levers 40–46 are in the extend detent during calibration (MIN_CAL_EXTEND, CAL_EXTEND, MAX_CAL_EXTEND), voltages required to enter and exit the extend detent (ENTER_EXTEND and EXIT_EXTEND), voltage at which full flow in the extend direction begins (FULL_FLOW_EXTEND), minimum, ideal and maximum voltages expected when control levers 40–46 are in the neutral position (MIN_NEUTRAL, NEUTRAL, MAX_NEUTRAL), voltage at which full flow in the retract direction beings (FULL_FLOW_RETRACT), voltages required to exit and enter the retract detent (EXIT_RETRACT and ENTER_RETRACT), minimum, ideal and maximum voltages expected to be read when control levers 40–46 are in the retract detent during calibration (MIN_CAL_RETRACT, CAL_RETRACT, MAX_CAL_RETRACT), and voltages required to exit and enter the float detent (EXIT_FLOAT and ENTER_FLOAT). The ideal center of the neutral position (NEUTRAL) is the average of CAL_EXTEND and CAL_RETRACT. The differences between ENTER_EXTEND and EXIT_EXTEND, EXIT_RETRACT and ENTER_RETRACT, and EXIT_FLOAT and ENTER_FLOAT, represents hysteresis.

The vertical axis of the bottom graph shows the command signals broadcast on bus 72. The command signals include a value of 0 (extend),1 (full flow extend), 125 (neutral), 248 (full flow retract), 249 (retract), 250 (float) and 254 (error). The command values for readings between FULL_FLOW_EXTEND and MIN_NEUTRAL, and MAX_NEUTRAL and FULL_FLOW_RETRACT, are proportional to the full flow values and are determined using straight-line equations. Thus, unique command signal values are associated with the neutral position and with each detent position, and proportional command values are associated with control lever positions between the extend detent and neutral positions, and between the neutral and retract detent positions. Proportional command values may be used for precision operations or for creeping.

Figure 7:
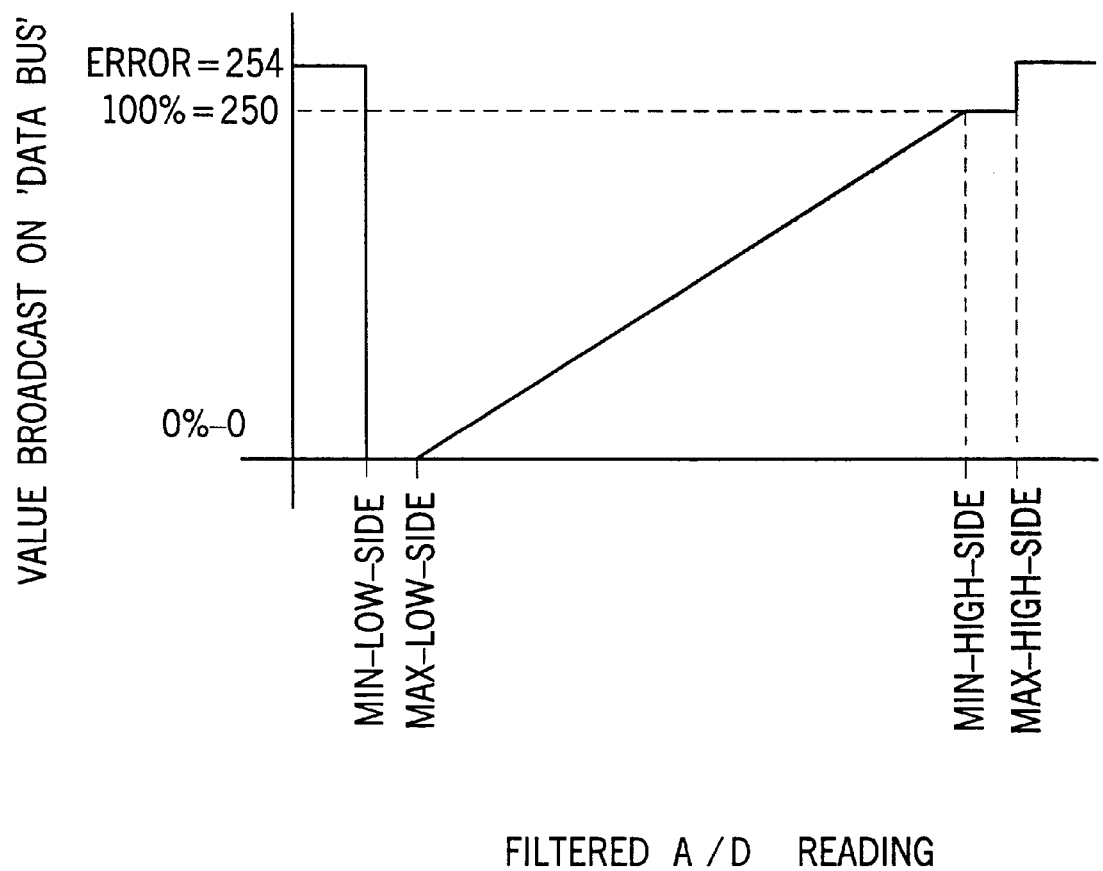
FIG. 7 shows scaling performed by the processing circuit of the armrest control unit to generate command signals from the auxiliary flow limit control knobs and the automatic kick-out timer set knob.

FIG. 7 shows the scaling of the filtered analog readings 302 for flow limit control knobs 58–66. The horizontal axis shows the filtered analog reading and includes points representing the minimum and maximum values expected to be read when the potentiometer is turned fully counter-clockwise (MIN_LOW_SIDE and MAX_LOW_SIDE) and fully clockwise (MIN_HIGH_SIDE and MAX_HIGH_SIDE). The vertical axis shows the command values broadcast on bus 72 including a value of 0 (0% flow limit), 250 (100% flow limit), and 254 (error). The command values for readings between MAX_LOW_SIDE and MIN_HIGH_SIDE are proportional and are given by straight-line equations. The scaling for other inputs is similar.

Alternatively, the scaled command signals could represent the position of the respective valve control lever 40–46 scaled by the respective flow limit. For example, if the input from flow limit control knob 58 corresponds to a flow limit of X and control lever 40 is in the extend detent position, the scaled command signal for valve 1 could represent an extend flow rate of X. The combination of the control lever position and flow limit for valve 1 into a single command signal could be used to decrease the loading on bus 72.

Figure 8:
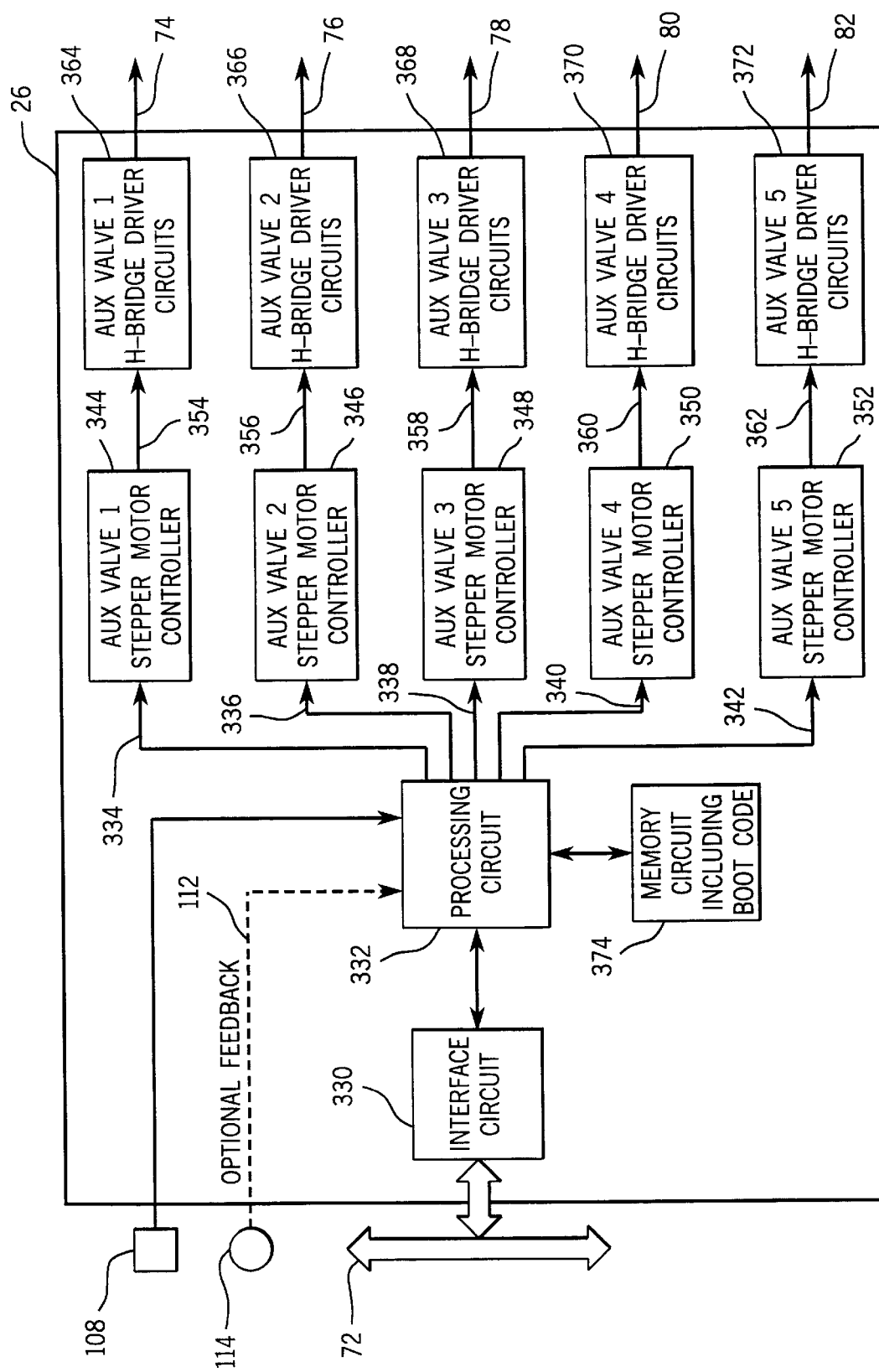
FIG. 8 is a block diagram of the auxiliary control unit shown in FIG. 1.

Referring to FIG. 8, auxiliary control unit 26 includes an interface circuit 330 for transmitting and receiving messages via bus 72, a processing circuit 332 for generating stepper motor control data 334–342 in response to the command signals from armrest control unit 24, stepper motor controllers 344–352 for generating control signals 354–362 for the stepper motors, and H-bridge driver circuits 364–372 for generating valve control signals 74–82 for valve assemblies 28–36. A memory circuit 374 may include volatile (e.g., RAM) and non-volatile (e.g., ROM, EPROM) memory. Processing circuit 332 also receives optional feedback signal 112 and a power signal from key switch 108.

Interface circuit 330 includes bus controller (e.g., an 82527) and CAN transceiver (e.g., 82C250) circuits for communication via bus 72. Processing and memory circuits 332 and 374 include a processor circuit (e.g., a 80C198 microcontroller) and a combination interface circuit (e.g., PSD312). Each stepper motor controller 344–352 includes an L297 circuit, and each H-bridge driver circuit 364–372 includes two L6203 drivers (one L6203 driver for each stepper motor phase). Auxiliary control unit 26 generates valve control signals 74–82 for moving the respective valve to the desired valve position.

Figure 9A:
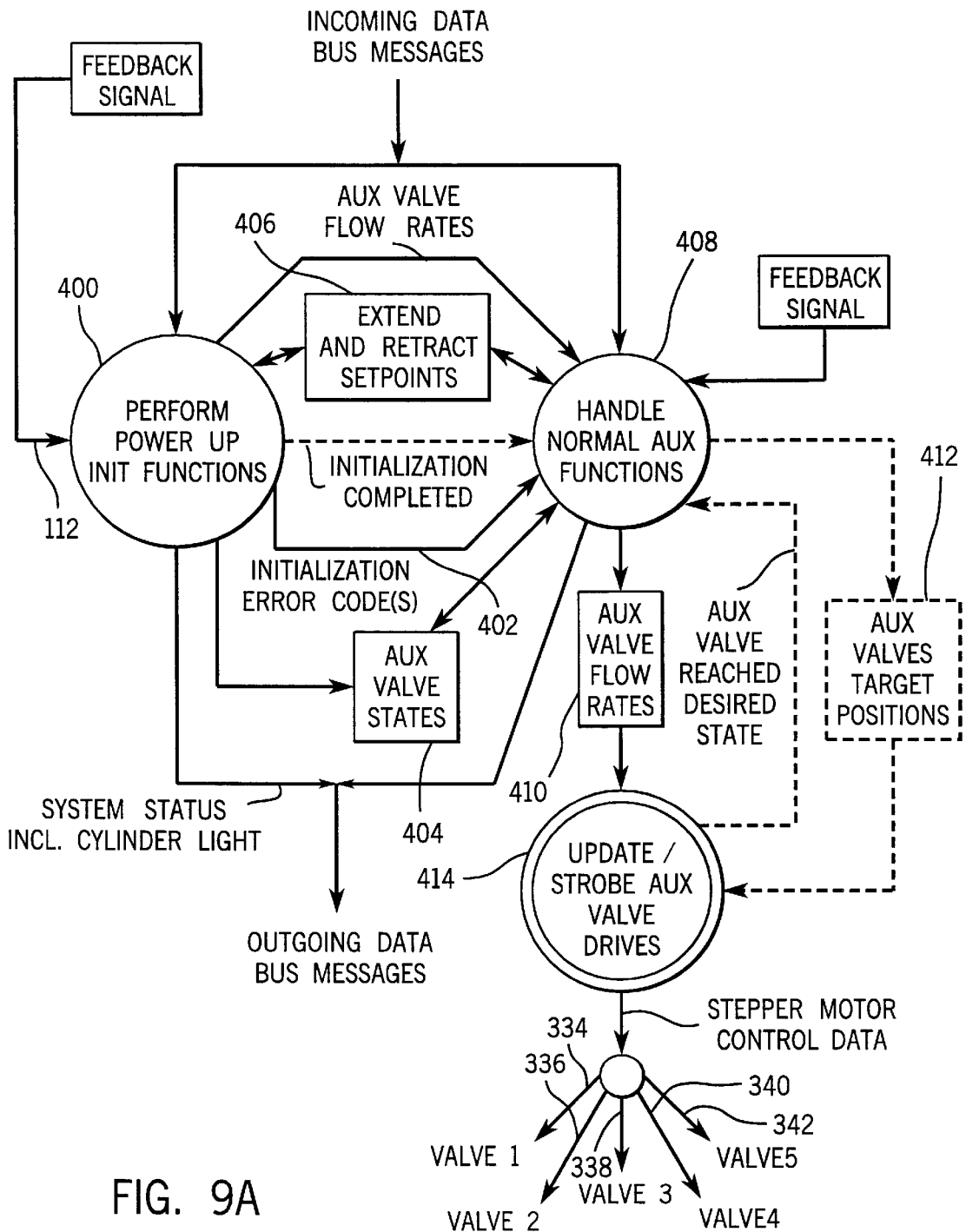
FIGS. 9A–9C are process diagrams for the processing circuit of the auxiliary control unit.
Figure 9B:
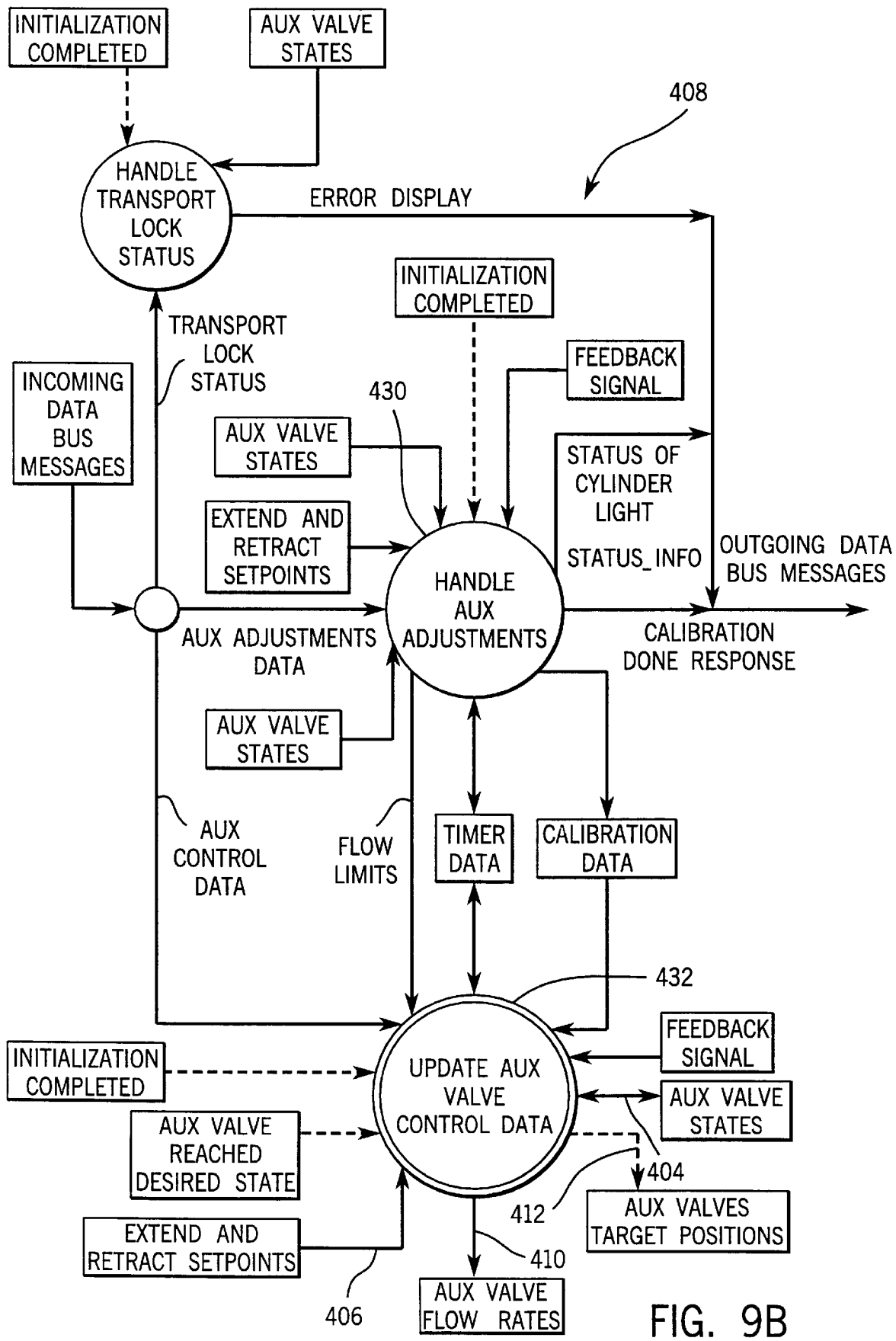
Figure 9C:
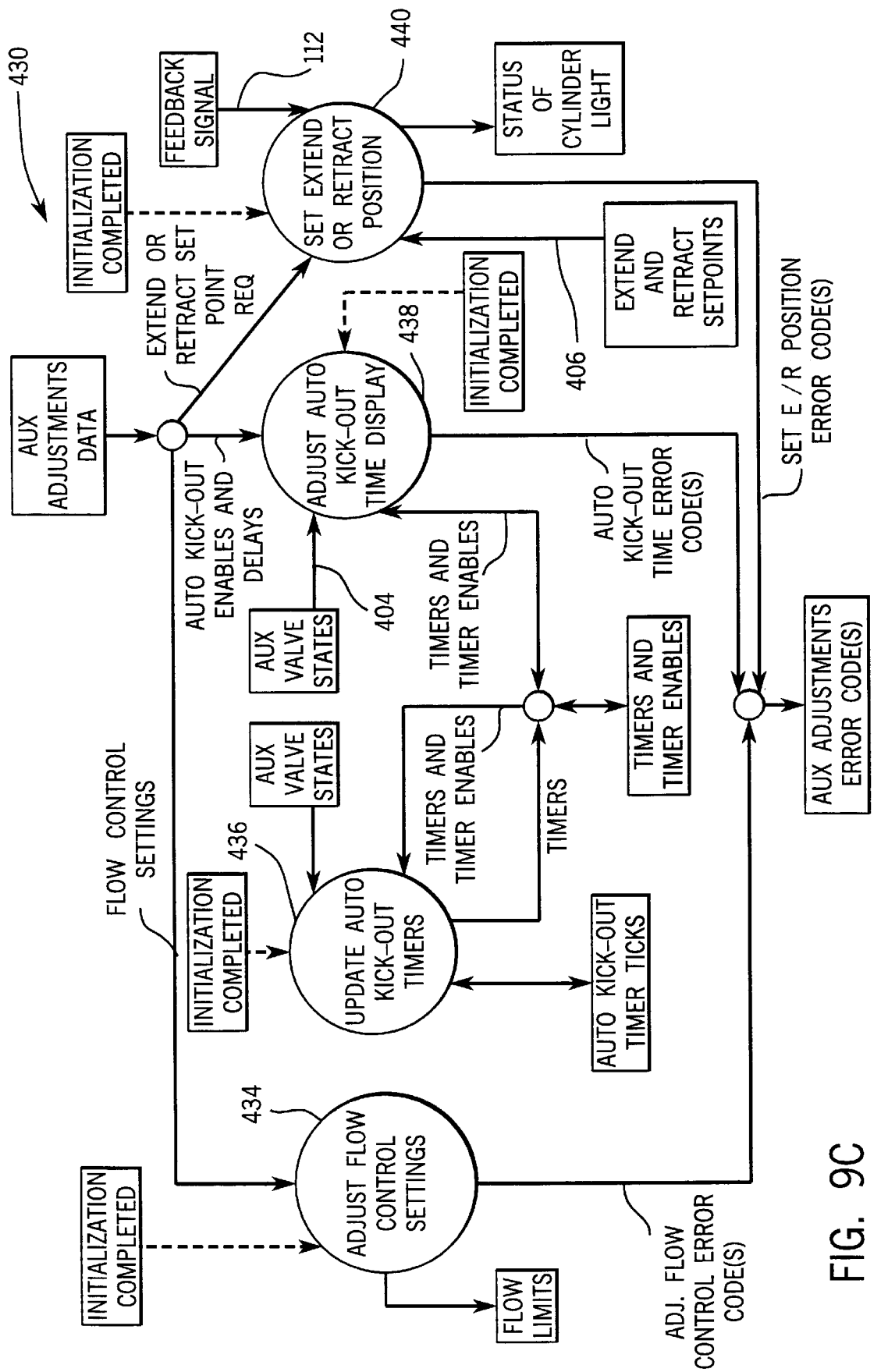

Referring to FIGS. 9A–9C, processing circuit 332 is programmed to control auxiliary valve assemblies 28–36 in one of several valve states. The desired valve state is determined during background processing. After the desired valve state is determined, control signals 74–82 are updated and strobed to valve assemblies 28–36 during foreground processing triggered on a time basis. Valve assemblies 28–34 are controlled in the following states:

FLOATING: Lever 40–46 is at float detent position;
FULL RETRACT: Lever is at full retract position;
PROP. RETRACT: Lever is at proportional retract position;
NEUTRAL: Lever is at neutral position;
IDLE: Transition state (wait for lever to pass through neutral before state can change);
PROP. EXTEND: Lever is at proportional extend position;
FULL EXTEND: Lever is at full extend position;
DEAD: Remove power from valve and disable valve.

Valve assembly 36, controlled by switch 48 instead of a lever, is controlled in the following states:

FULL RETRACT: Switch 48 is at retract position;
NEUTRAL: Switch is at neutral position;
IDLE: Transition state (wait for switch to pass through neutral before state can change);
FULL EXTEND: Switch is at extend position;
DEAD: Remove power from valve and disable valve.

Referring to process 400 illustrated in FIG. 9A, processing circuit 332 performs initialization logic upon power up. Power-up functions include setting error codes 402 (e.g., EEPROM data invalid; bus error; regulated voltage range error; valve present when not supposed to be; valve not present when supposed to be; valve phase circuit error), setting valve states 404 to DEAD when errors are detected and IDLE when the valves are functional, determining if cylinder position feedback signal 112 is present (i.e., within range) and clearing extend and retract setpoints 406 if signal 112 is not present (indicating that remote cylinder position mode may not be used for valve 1), setting cylinder light status to "ON" when signal 112 is present and setpoints 406 are set and to "OFF"otherwise, and entering a control loop when the power-up logic is complete. Status data is transmitted via data bus 72.

In process 408, processing circuit 332 handles background auxiliary functions (described in relation to FIG. 9B) to update valve states 404, extend and retract set points 406, valve flow rates 410 and valve target positions 412 in response to incoming messages from bus 72 which contain the command signals from armrest control unit 24. In foreground process 414, processing circuit 332 generates stepper motor control signals 334–342 in response to flow rates 410 and target positions 412.

Referring to FIG. 9B, the operation of processing circuit 332 in process 408 is shown in further detail. In process 430, processing circuit 332 adjusts the flow limits for each valve, updates the automatic kick-out timers for each valve, adjusts the automatic kick-out time delay for each valve, and sets the extend or retract positions as explained further in relation to FIG. 9C.

In process 432, processing circuit 332 updates valve states 404, flow rates 410 and valve target positions 412 as follows. State 404 for valve 5 is set to DEAD and the valve is disabled when valve control switch 48 indicates both extend and retract commands. Then, for each valve which is not in DEAD state, valve state 404 is updated according to the event state table of FIG. 10. The horizontal axis represents the current valve state, the vertical axis represents a detected event, and the table output represents the updated valve state. For example, if the state of valve 3 is FULL RETRACTING, and control lever 44 is moved to a proportional retracting position (i.e., a retract feel position), the valve state becomes the PROPORTIONAL RETRACTING state. Then, the valve state is set to DEAD for each valve with a range-failed control lever position. Valve target positions 412 are updated based upon the updated valve state.

Then, for each valve for which the respective control lever 40–46 was just moved to the extend detent or retract detent position (or for valve 5 if switch 48 was just moved to the extend or retract switch position), an automatic kick-out timer (set using kick-out timer set knob 68) is activated and the flow rate for the valve is set to the valve's flow limit. However, the automatic kick-out timer is deactivated for each valve for which the respective valve control lever was just moved out of the extend detent or retract detent position. Then, for valves 1–4 only, if the control lever is in a feel (i.e., proportional) position, the automatic kick-out timer is deactivated and the flow rate is set to a proportion of the valve's flow limit determined by the control lever position for that valve. Finally, the flow rate is set to neutral or zero flow for each valve in the NEUTRAL, IDLE or DEAD state. Thus, the flow rate for each valve is set to a value which depends upon a flow limit setting selected by the operator for the particular attachment.

Referring to FIG. 9C, in process 434, processing circuit 332 adjusts the flow limit for each valve to correspond to a flow control setting from the respective flow limit control knob 58–66, and sets an error code if the flow control setting is out of range. In process 436, processing circuit 332 adjusts the automatic kick-out timer for each valve when the valve state is not DEAD and the timer is enabled and running. Note that kick-out timer disable switches 50–56 disable the timers when the respective guide 208 is in the MOTOR rotational position.

In process 438, processing circuit 334 adjusts the automatic kick-out time delay for each valve which is not DEAD as follows. In response to kick-out timer enable signals derived from switches 50–56 and received from bus 72, automatic kick-out timers are enabled and the timers are started when the valve state corresponds to an extend detent or retract detent event. The kick-out timers are disabled in response to kick-out timer disable signals from bus 72. Then, if the automatic kick-out delay time base set by knob 68 has changed, the new value is range-checked (e.g., the valid range may be 1–15). If the new time base is out of range, an error code is set and a default time base is used. The automatic kick-out delay for each valve is updated to the new time base.

In process 440, processing circuit 332 sets the extend and retract set points 406 as follows. If the extend and retract set point requests from switch 70 are both active, an error code is set. Otherwise, the extend set point is set equal to position feedback signal 112 in response to an extend set point request, and the retract set point is set equal to position feedback signal 112 in response to a retract set point request. Once both set points are set, the cylinder status light is set "ON".

In operation, an operator independently controls the flow of hydraulic fluid through auxiliary valves 1–4 in one of several modes selected using arm 224 to rotate guide 208. Then, the respective control lever 40–46 is moved to a flow command position within an allowed range. For valve 5, the flow rate is controlled using switch 48. Maximum flow rate through each valve is set independently using flow limit control knobs 58–66. Using detent and feel lever positions, flow rates are commanded for valves 1–4 which correspond to a maximum extend flow rate, a proportional extend flow rate, a neutral flow rate, a proportional retract flow rate and a maximum retract flow rate. An operator can also select a float valve position wherein the valve spool is positioned such that there is no forced flow in either direction. In float position, the attachment may, for example, move up or down with the ground, or move down by the force of gravity. For valve 5, the operator can command a maximum extend flow rate, a neutral flow rate, and a maximum retract flow rate.

Typically, the maximum extend and maximum retract flow rates continue for a predetermined time period after the respective control lever is moved into the extend detent or raise detent position (or extend or retract switch position). After this time period, an automatic kick-out occurs and the flow drops to neutral (i.e., 0 flow). The automatic kick-out prevents the system from remaining in "high standby" status and robbing the system of power when, for example, a hydraulic cylinder has already reached a desired position. Typically, the kick-out time period will be set using knob 68 to supply flow for a time period (e.g., 10 sec) longer than the time required to move the slowest attachment (e.g., 8 sec).

If the control lever moves out of the extend detent or retract detent position before a kick-out occurs, the timer is reset and flow rate follows the control lever proportionately. If the control lever is not moved until after a kick-out occurs, the control lever must be first moved to the neutral position before the flow rate can be controlled again. In addition, if guide 208 of control lever assembly 160 is moved into the "MOTOR" position, the automatic kick-out function is disabled and the flow continues indefinitely. MOTOR position, then, is used for hydraulic motors which require continuous flow.

Valve 1 can also operate in an optional cylinder position mode wherein, when control lever 40 is moved into the extend detent or retract detent position, flow continues until a cylinder position feedback signal reaches a predetermined extend or retract position. The predetermined extend and retract positions are set by the operator using limit switch 70, and the cylinder position mode is used when a feedback signal is present and the extend and retract limits have been stored in memory.

In describing the scaling performed by processing circuit 266 of armrest control unit 24 in relation to FIG. 6, it was assumed that the positions of control levers 40–46 can be accurately determined by comparing the filtered analog readings to expected values. The relatively low accuracy of typical control lever sensing circuits, however, makes such determinations difficult. For example, potentiometer 238 may have an accuracy of ±10%. The problem is particularly troublesome where, as here, a control lever is positionable in one or more detent positions which must be accurately distinguished by a control circuit. The detent positions cause, for example, the breakpoints in the line shown in FIG. 6. Thus, a relatively accurate method of reading the operating positions of control lever 40–46 is required.

Therefore, auxiliary hydraulic system 12 calibrates control levers 40–46 and generates calibrated command signals. The calibration involves moving each control lever 40–46 into the extend detent and retract detent positions, converting the resulting position signals sensed by potentiometer 238 into extend and retract calibration values, and storing the calibration values in EEPROM as in the memory map shown in FIG. 11. CAL_AUXn_EXTEND and CAL_AUXn_RETRACT correspond to the digitized readings when the nth control lever (n=1 to 4) is moved into the extend detent and retract detent positions, respectively, during a calibration procedure.

During operation, when control levers 40–46 are in operating positions, processing circuit 266 uses stored calibration values CAL_AUXn_EXTEND and CAL_AUXn_RETRACT for CAL_EXTEND and CAL_RETRACT in FIG. 6, respectively. Some or all of the other filtered A/D reading values in FIG. 6 may be based upon these calibration values. For example, in a preferred embodiment using a 10-bit A/D converter, the values are defined as follows:

| NAME OF POINT | ANGLE | A/D READING |
|---|---|---|
| MIN | | 60 |
| MIN_CAL_EXTEND | | 74 |
| CAL_EXTEND | −18° | CAL_EXTEND |
| MAX_CAL_EXTEND | | 194 |
| ENTER_EXTEND | | CAL_EXTEND + 30 |
| EXIT_EXTEND | | CAL_EXTEND + 90 |
| FULL_FLOW_EXTEND | | CAL_EXTEND + 120 |
| MIN_NEUTRAL | | NEUTRAL − 60 |
| NEUTRAL | 0° | (CAL_EXTEND + CAL_RETRACT)/2 |
| MAX_NEUTRAL | | NEUTRAL + 60 |
| FULL_FLOW_RETRACT | | CAL_RETRACT − 120 |
| EXIT_RETRACT | | CAL_RETRACT − 90 |
| ENTER_RETRACT | | CAL_RETRACT − 30 |
| MIN_CAL_RETRACT | | 599 |
| CAL_RETRACT | +18° | CAL_RETRACT |
| MAX_CAL_RETRACT | | 719 |
| EXIT_FLOAT | | CAL_RETRACT + 60 |
| ENTER_FLOAT | | CAL_RETRACT + 90 |
| MAX | | 932 |

Thus, the scaled position signals are calibrated using the calibration values.

Figure 12:
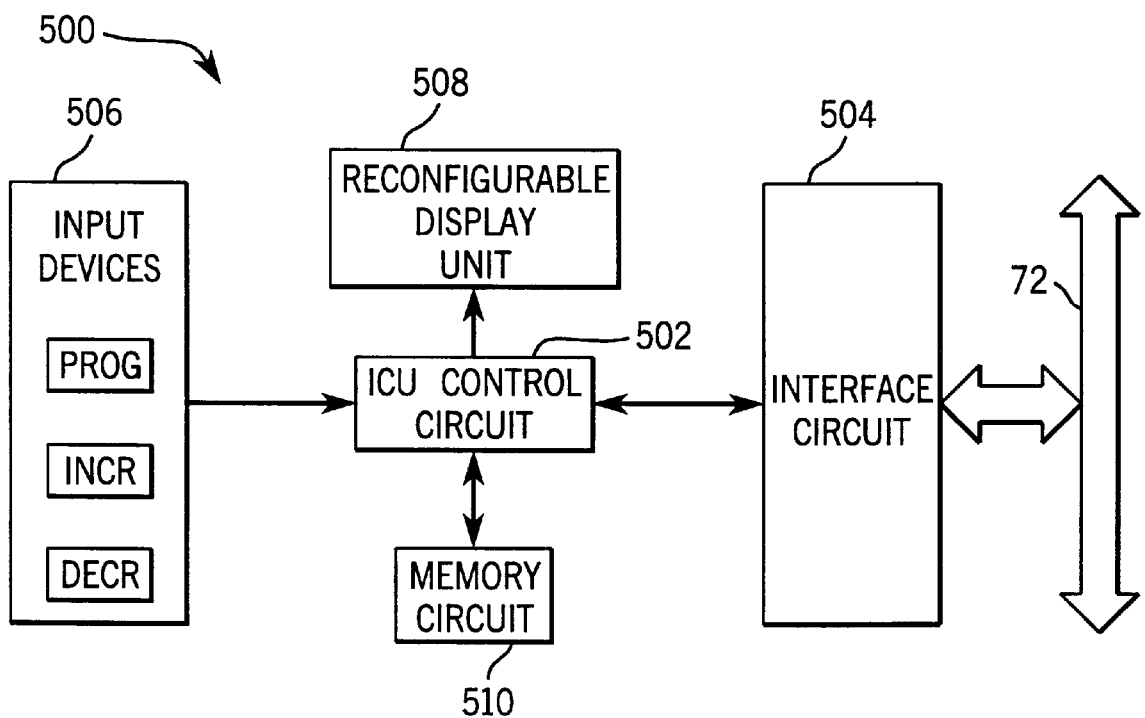
FIG. 12 is a block diagram of an instrumentation control unit (ICU) used for providing an operator input and output interface during calibration and configuration of the auxiliary hydraulic system and other systems.

Referring to FIG. 12, calibration of auxiliary hydraulic system 12 and of other systems connected to bus 72 is controlled by an instrumentation control unit (ICU) 500. ICU 500 includes an ICU control circuit 502, an interface circuit 504 for communication via bus 72, input devices 506 including PROGRAM, INCREMENT and DECREMENT buttons for operator calibration inputs, a reconfigurable display unit 508 for providing feedback to the operator, and a memory circuit 510.

Figure 13:
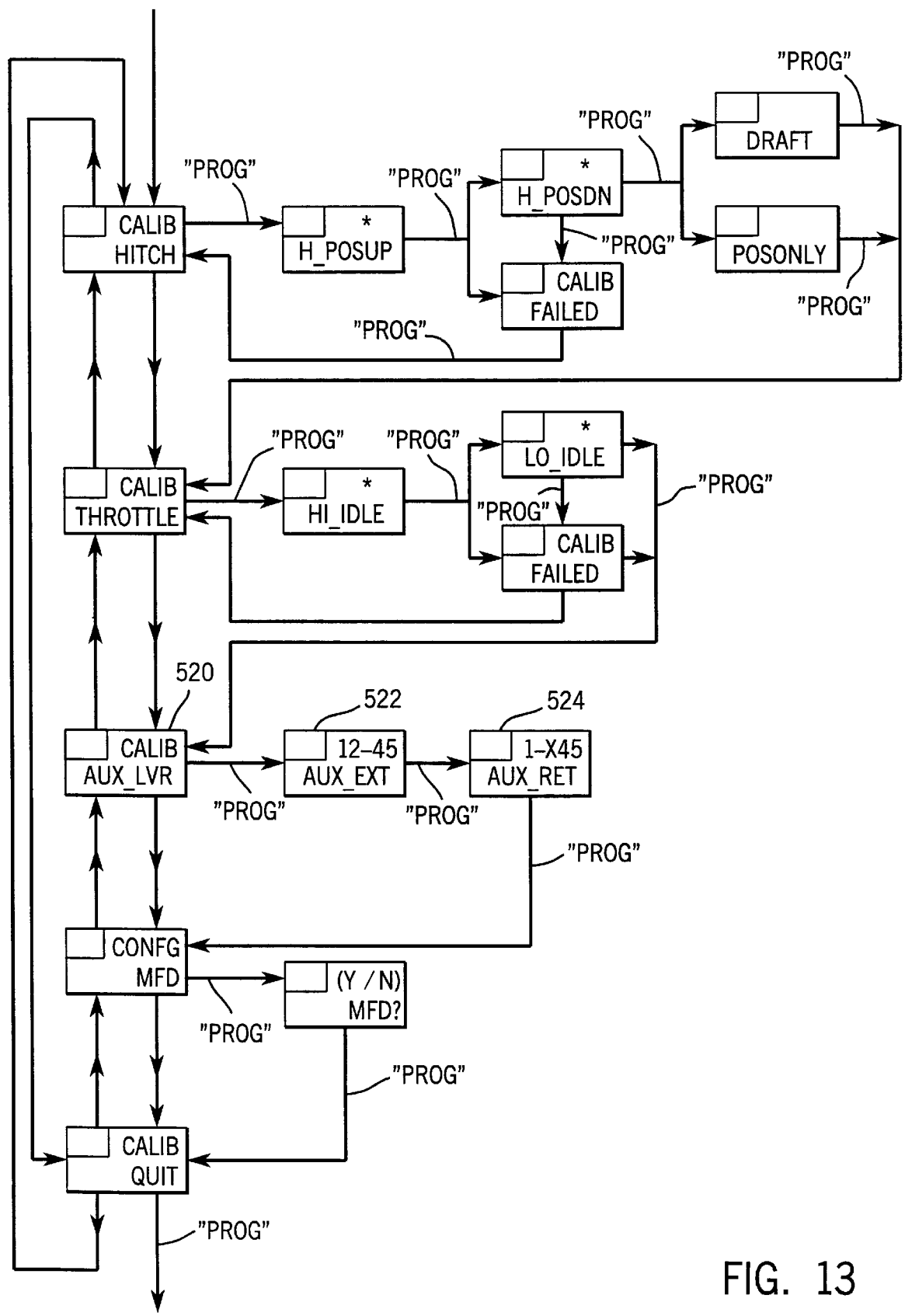
FIG. 13 is a block diagram showing the calibration procedure for the auxiliary hydraulic and other systems.

Referring to FIG. 13, the calibration procedure for auxiliary hydraulic system 12 is shown. Auxiliary hydraulic system 12, and other systems, are calibrated and configured through ICU 500. The calibration options are presented to the operator via display unit 508, and the options are selected by pressing the PROGRAM ("PROG") and INCREMENT/DECREMENT buttons (arrows). For example, the operator can cycle through calibration options for the hitch, throttle and auxiliary hydraulic system 12.

Using the INCREMENT/DECREMENT buttons, the operator is presented with display 520. "CALIB" on the top line of display 520 indicates that control levers 40–46 will be calibrated if the "PROG" button is actuated. After pressing "PROG", display 522 shows "AUX_EXT" to request the operator to activate valve control switch 48 to the EXTEND position and to move each control lever 40–46 to the extend detent position. The top line of display 522 indicates the command devices which have been moved to the extend position (control levers 40, 42 and 46; switch 48). The "−" indicates that control lever 44 is not in the general area expected for the extend detent position.

Another press of the "PROG" button presents the operator with display 524. "AUX_RET" requests the operator to activate valve control switch 48 to the RETRACT position and to move each control lever 40–46 to the retract detent position. The top line of display 524 indicates the command devices which have been moved to the retract position (control levers 40 and 46; switch 48). "–" indicates that control lever 42 is not in the general area expected for the retract detent position. "X" indicates that a valid extend position was not noted for control lever 44 in the previous step. Calibration of auxiliary hydraulic system 12 is now complete, and the operator can exit by pressing "PROG" again.

Auxiliary hydraulic system 12 can be configured to use different numbers of auxiliary hydraulic valves. The configuration of valves 1–4 is based upon whether valid calibration values are stored in EEPROM. The valve is assumed to be present if valid calibration values are stored, and is otherwise assumed to be not present. The configuration of valve 5 is based upon whether control switch 48 was active during calibration based upon a flag (AUX5_PRESENT in FIG. 11) stored in EEPROM.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A method of generating a calibrated command signal in a control system including at least one command device moveable between first and second predefined positions and a position sense circuit coupled to the command device and configured to generate a position signal representative of the position of the command device, the method comprising the steps of:
   (a) calibrating the command device by performing the steps comprising:
      (1) moving the command device into the first predefined position, converting the resulting position signal into a first calibration value, and storing the first calibration value in a memory circuit; and
      (2) moving the command device into the second predefined position, converting the resulting position signal into a second calibration value, and storing the second calibration value in the memory circuit; and
   (b) after step (a), generating a calibrated command signal by performing the steps comprising:
      (1) moving the command device into an operating position, and converting the resulting position signal into an operating position signal; and
      (2) generating the calibrated command signal based upon the operating position signal, the first calibration value and the second calibration value, wherein the calibrated command signal represents a first and a second predetermined command value when the operating position signal is within a first and a second deadband defined about the first and the second calibration value, respectively, wherein the calibrated command signal represents a proportional command value when the operating position signal is between the first and the second deadbands.

2. The method of claim 1 further comprising the step of applying hysteresis when determining if the operating position signal is within the first or the second deadband.

3. The method of claim 1 wherein step (a) further includes the step of range checking the first and the second calibration values.

4. The method of claim 1 wherein step (b) further includes the step of range checking the operating position signal.

5. The method of claim 1 wherein movement of the command device is limited within one of a plurality of ranges selected by a lever lock, and step (a) further comprises the step of selecting a range of movement which includes the first and the second predefined positions.

6. A method of generating a calibrated command signal in a control system including at least one command device moveable between first detent, neutral and second detent positions, and a position sense circuit coupled to the command device and configured to generate a position signal representative of the position of the command device, the method comprising the steps of:
   (a) calibrating the command device by performing the steps comprising:
      (1) moving the command device into the first detent position, converting the resulting position signal into a first calibration value, and storing the first calibration value in a memory circuit; and
      (2) moving the command device into the second detent position, converting the resulting position signal into a second calibration value, and storing the second calibration value in the memory circuit; and
   (b) after step (a), generating a calibrated command signal by performing the steps comprising:
      (1) moving the command device into an operating position, and converting the resulting position signal into an operating position signal; and
      (2) generating the calibrated command signal based upon the operating position signal, the first calibration value, a neutral value representing the neutral position of the command device, and the second calibration value.

7. The method of claim 6 wherein the neutral position of the command device is centered between the first detent and the second detent positions.

8. The method of claim 7 wherein the neutral value is defined as the average of the first and the second calibration values.

9. The method of claim 6 wherein the neutral position of the command device includes a neutral detent, and step (a) includes the step of moving the command device into the neutral detent position, converting the resulting position signal into a neutral calibration value, and storing the neutral calibration value in the memory circuit, and wherein the neutral value equals the neutral calibration value.

10. The method of claim 6 wherein the calibrated command signal represents a first command limit, a neutral command value and a second command limit when the operating position signal is substantially equal to the first calibration value, the neutral value and the second calibration value, respectively.

11. The method of claim 10 wherein the calibrated command signal represents a proportional command value when the operating position signal is between the first calibration value and the neutral value or between the neutral value and the second calibration value.

12. The method of claim 6 wherein the calibrated command signal represents a first and a second command limit when the operating position signal is within a first and a second deadband defined about the first and the second calibration value, respectively.

13. The method of claim 12 wherein the calibrated command signal represents a neutral command value when the operating position signal is within a third deadband defined about the neutral value.

14. The method of claim 13 wherein the calibrated command signal represents a proportional command value when the operating position signal is between the first deadband and the third deadband, or between the third deadband and the second deadband.

15. The method of claim 14 further comprising the step of applying hysteresis when determining if the operating position signal is within the first or the second deadband.

16. The method of claim 6 wherein step (a) further includes the step of range checking the first and the second calibration values.

17. The method of claim 6 wherein step (b) further includes the step of range checking the operating position signal.

18. The method of claim 6 wherein the command device is further moveable to a third detent position beyond one of the first detent and the second detent positions, and the calibrated command signal represents a value indicative of the third detent when the command device is moved to the third detent position.

19. The method of claim 6 wherein movement of the command device is limited within one of a plurality of ranges selected by a lever lock, and step (a) further comprises the step of selecting a range of movement which includes the first and the second detent positions.

20. A method of generating a calibrated command signal in an auxiliary hydraulic control system including a plurality of control levers and auxiliary valves, each control lever moveable between extend detent, neutral, retract detent and float detent positions, the float detent position being beyond one of the extend detent and retract detent positions, the auxiliary hydraulic control system further including a plurality of position sense circuits coupled to the control levers for generating position signals representative of the positions of the control levers, the method comprising the steps of:

(a) calibrating each control lever by performing the steps comprising:
  (1) moving the control lever into the extend detent position, converting the resulting position signal into an extend calibration value, and storing the extend calibration value in a memory circuit; and
  (2) moving the control lever into the retract detent position, converting the resulting position signal into a retract calibration value, and storing the retract calibration value in the memory circuit; and (b) after step (a), generating a calibrated command signal based upon the position of each control lever by performing the steps comprising:
  (1) moving the control lever into an operating position, and converting the resulting position signal into an operating position signal; and
  (2) generating the calibrated command signal based upon the operating position signal, the extend calibration value, a neutral value representing the neutral position of the control lever, and the retract calibration value.

21. The method of claim 20 wherein the calibrated command signal represents a maximum extend flow rate, a neutral flow rate, a maximum retract flow rate and a float rate when the operating position signal is substantially equal to the extend calibration value, the neutral value, the retract calibration value and a value corresponding to the float detent, respectively.

22. The method of claim 21 wherein the calibrated command signal represents a proportional extend flow rate when the operating position signal is between the extend calibration value and the neutral value, and is representative of a proportional retract flow rate when the operating position signal is between the neutral value and the retract calibration value.

23. The method of claim 20 wherein step (a) is performed for each potential control lever which may be present in the auxiliary hydraulic system, and a flag indicates whether each control lever was successfully calibrated.

24. The method of claim 20 wherein movement of the command device is limited within one of a plurality of ranges selected by a lever lock, and step (a) further comprises the step of selecting a range of movement which includes the extend detent and retract detent positions.

25. A method of generating a calibrated command signal in a control system including at least one command device moveable between first and second detent positions, and a position sense circuit coupled to the command device and configured to generate a position signal representative of the position of the command device, the method comprising the steps of:

(a) calibrating the command device by performing the steps comprising:
  (1) moving the command device into the first detent position, converting the resulting position signal into a first calibration value, and storing the first calibration value in a memory circuit; and
  (2) moving the command device into the second detent position, converting the resulting position signal into a second calibration value, and storing the second calibration value in the memory circuit; and (b) after step (a), generating a calibrated command signal by performing the steps comprising:
  (1) moving the command device into an operating position, and converting the resulting position signal into an operating position signal; and
  (2) generating the calibrated command signal based upon the operating position signal, the first calibration value and the second calibration value.

26. The method of claim 25 wherein the calibrated command signal represents a first and a second predetermined command value when the operating position signal is within a first and a second deadband defined about the first and the second calibration value, respectively.

27. The method of claim 25 wherein the calibrated command signal represents a proportional command value when the operating position signal is between the first and the second deadbands.

28. The method of claim 26 further comprising the step of applying hysteresis when determining if the operating position signal is within the first or the second deadband.

29. The method of claim 25 wherein step (a) further includes the step of range checking the first and the second calibration values.

30. The method of claim 25 wherein step (b) further includes the step of range checking the operating position signal.

31. The method of claim 25 wherein movement of the command device is limited within one of a plurality of ranges selected by a lever lock, and step (a) further comprises the step of selecting a range of movement which includes the first and the second detent positions.

* * * * *